(12) United States Patent
Bissonnette et al.

(10) Patent No.: US 7,291,072 B2
(45) Date of Patent: *Nov. 6, 2007

(54) PERFORMANCE MEASUREMENT SYSTEM WITH FLUORESCENT MARKERS FOR GOLF EQUIPMENT

(75) Inventors: Laurent C. Bissonnette, Portsmouth, RI (US); William Gobush, North Dartmouth, MA (US); Diane I. Pelletier, Fairhaven, MA (US); Mitchell E. Lutz, Fairhaven, MA (US)

(73) Assignee: Acushnet Company, Fairhaven, MA (US)

( * ) Notice: Subject to any disclaimer, the term of this patent is extended or adjusted under 35 U.S.C. 154(b) by 661 days.

This patent is subject to a terminal disclaimer.

(21) Appl. No.: 10/322,601

(22) Filed: Dec. 19, 2002

(65) Prior Publication Data

US 2003/0130054 A1 Jul. 10, 2003

Related U.S. Application Data

(60) Continuation-in-part of application No. 10/002,174, filed on Dec. 5, 2001, now Pat. No. 7,086,954, which is a continuation-in-part of application No. 09/782,278, filed on Feb. 14, 2001, now Pat. No. 6,758,759, which is a continuation-in-part of application No. 09/468,351, filed on Dec. 21, 1999, now Pat. No. 6,500,073, which is a continuation-in-part of application No. 08/751,447, filed on Nov. 18, 1996, now Pat. No. 5,803,823, which is a continuation of application No. 08/510,085, filed on Aug. 1, 1995, now Pat. No. 5,575,719, which is a division of application No. 08/209,169, filed on Feb. 24, 1994, now Pat. No. 5,501,463, which is a continuation of application No. 07/979,712, filed on Nov. 20, 1992, now abandoned.

(51) Int. Cl.
*A63B 69/36* (2006.01)

(52) U.S. Cl. .................. 473/198; 348/157; 348/135
(58) Field of Classification Search ............ None
See application file for complete search history.

(56) References Cited

U.S. PATENT DOCUMENTS 3,513,707 A 5/1970 Russell et al. .......... 152/379

(Continued)

OTHER PUBLICATIONS

The Wall Street Journal, Nov. 1997, Bill Richards, "Why It takes a Rocket Scientist to Design a Golf Ball," pp. B1 and B11.

(Continued)

*Primary Examiner*—Mark Sager
(74) *Attorney, Agent, or Firm*—Bingham McCutchen LLP

(57) ABSTRACT

The present invention is directed to a monitor system that measures flight characteristics of at least one object moving in a predetermined field-of-view using at least one fluorescent marker. The system may include a lighting unit with a light filter, at least one camera unit with a camera filter. The lighting unit directs light in the direction of the object. If there is a light filter the light is filtered prior to reaching the object. The camera unit is pointed toward the object and the camera filter inhibits all wavelengths except those in a certain range. The reflected light from the object is transmitted to the camera through the camera filter. In one embodiment, the system includes a camera filter that is electronically switchable between at least two colors. The present invention further includes methods for monitoring at least one object with at least one marker using filters.

24 Claims, 17 Drawing Sheets

U.S. PATENT DOCUMENTS

| | | | |
|---|---|---|---|
| 3,601,408 A * | 8/1971 | Wright | 473/225 |
| 3,630,601 A | 12/1971 | Lehovec | 356/256 |
| 3,918,073 A | 11/1975 | Henderson et al. | 396/335 |
| 3,918,719 A * | 11/1975 | Welch | 473/409 |
| 4,063,259 A | 12/1977 | Lynch et al. | 354/120 |
| 4,136,387 A | 1/1979 | Sullivan et al. | 364/410 |
| 4,137,556 A | 1/1979 | Sessa | 361/91 |
| 4,158,853 A | 6/1979 | Sullivan et al. | 358/93 |
| 4,160,942 A | 7/1979 | Lynch et al. | 350/120 |
| 4,306,722 A | 12/1981 | Rusnak | 473/221 |
| 4,327,918 A | 5/1982 | Foster | 473/221 |
| 4,375,887 A | 3/1983 | Lynch et al. | 273/32 |
| 4,461,477 A | 7/1984 | Stewart | 273/26 |
| 4,477,079 A | 10/1984 | White | 273/186 |
| 4,695,888 A | 9/1987 | Peterson | 358/213 |
| 4,695,891 A | 9/1987 | Peterson | 358/213 |
| 4,713,686 A | 12/1987 | Ozaki et al. | 358/107 |
| 4,858,934 A | 8/1989 | Ladick et al. | 273/186 |
| 4,893,182 A | 1/1990 | Gautraud et al. | 358/105 |
| 5,024,441 A * | 6/1991 | Rousseau | 473/155 |
| 5,101,268 A | 3/1992 | Ohba | 358/88 |
| 5,111,410 A | 5/1992 | Nakayama et al. | 364/551 |
| 5,179,441 A | 1/1993 | Anderson et al. | 358/88 |
| 5,210,603 A | 5/1993 | Sabin | 358/93 |
| 5,297,796 A | 3/1994 | Peterson | 273/183 |
| 5,342,054 A | 8/1994 | Chang et al. | 273/186.1 |
| 5,471,383 A | 11/1995 | Gobush et al. | 364/410 |
| 5,481,355 A * | 1/1996 | Iijima et al. | 356/28 |
| 5,501,463 A | 3/1996 | Gobush et al. | 273/184 |
| 5,575,719 A | 11/1996 | Gobush et al. | 473/223 |
| 5,589,628 A | 12/1996 | Braly | 73/12 |
| 5,803,823 A | 9/1998 | Gobush et al. | 473/223 |
| 5,839,718 A * | 11/1998 | Hase et al. | 252/301.4 F |
| 6,011,359 A | 1/2000 | Days | 315/241 |
| 6,241,622 B1 | 6/2001 | Gobush et al. | 473/199 |
| 6,533,674 B1 * | 3/2003 | Gobush | 473/199 |
| 6,758,759 B2 * | 7/2004 | Gobush et al. | 473/131 |
| 6,821,211 B2 * | 11/2004 | Otten et al. | 473/219 |
| 7,086,954 B2 * | 8/2006 | Gobush et al. | 473/198 |
| 2001/0043757 A1 | 11/2001 | Asakura | 382/289 |

OTHER PUBLICATIONS

Scientific American, Jan. 1997, Mion, et al., "Tackling Turbulence with Supercomputers," pp. 62-68.

Science and Golf II, 1.sup.st Edition, Jul. 1994, Gobush et al., "Video Monitoring Systems to Measure Initial Launch Characteristics of Golf Ball," Ch. 50, pp. 327-333.

Science and Golf, 1.sup.st Edition, Jul. 1990, Chiraraishi et al., "A new method on measurement of trajectories of a golf ball", pp. 193-198.

Science and Golf, 1.sup.st Edition. S. Aoyama, Jul. 1990, "A modern method for the mesurement of areodynamic lift and drag on golf balls," pp. 199-204.

* cited by examiner

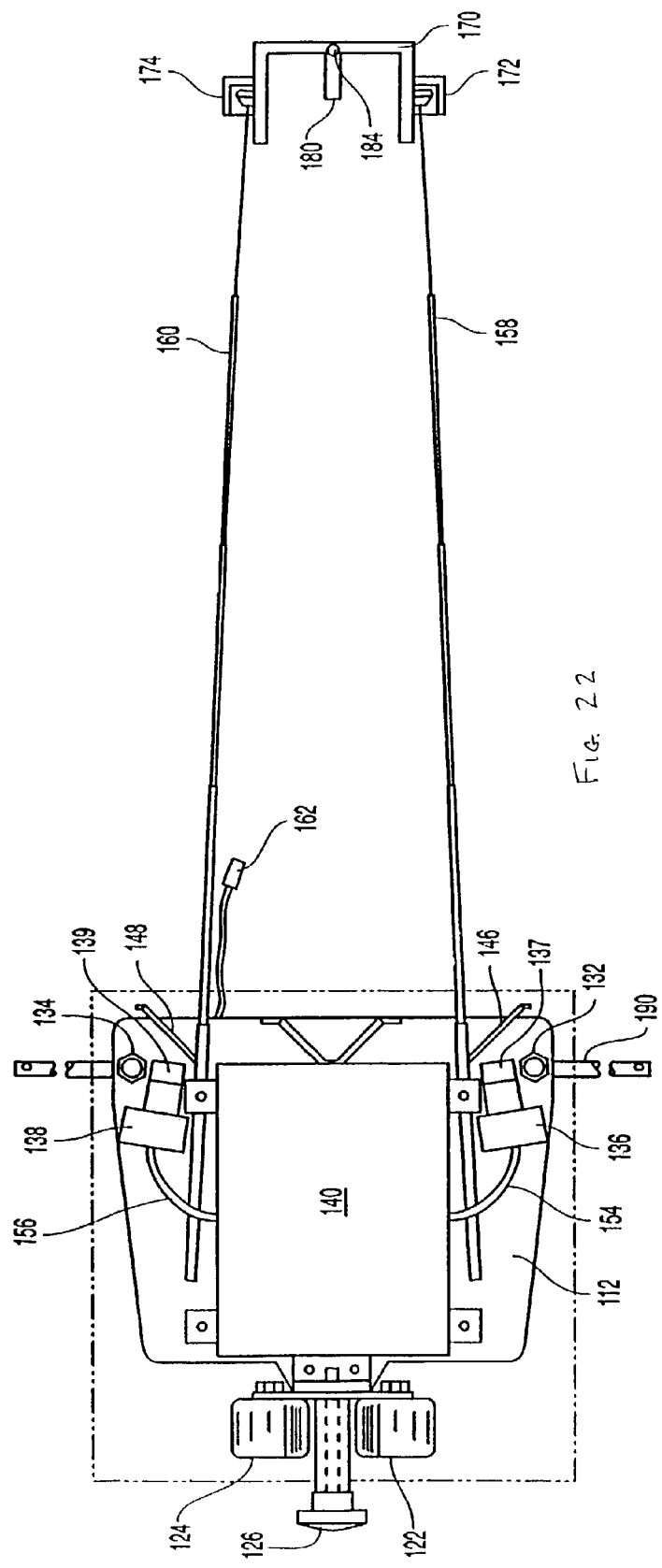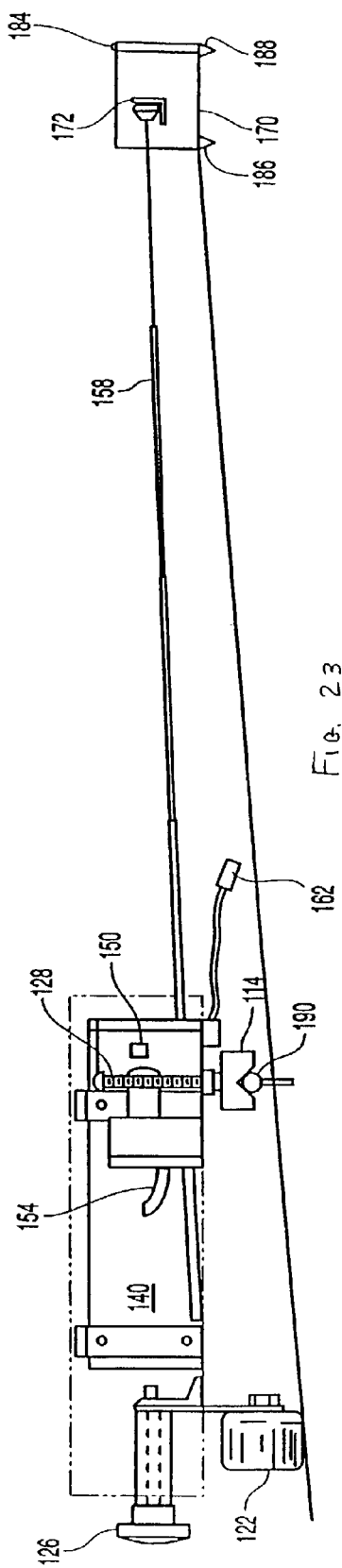

PERFORMANCE MEASUREMENT SYSTEM WITH FLUORESCENT MARKERS FOR GOLF EQUIPMENT

CROSS-REFERENCE TO RELATED APPLICATIONS

This application is a continuation-in-part application of U.S. application Ser. No. 10/002,174 filed on Dec. 5, 2001, now U.S. Pat. No. 7,086,954, which is a continuation-in-part application of U.S. application Ser. No. 09/782,278 filed on Feb. 14, 2001, now U.S. Pat. No. 6,758,759.

This application is also a continuation-in-part application of U.S. application Ser. No. 09/468,351 filed on Dec. 21, 1999, now U.S. Pat. No. 6,500,073, which is a continuation-in-part application of U.S. application Ser. No. 08/751,447 filed on Nov. 18, 1996, now U.S. Pat. No. 5,803,823, which is a continuation application of U.S. application Ser. No. 08/510,085 filed Aug. 1, 1995, now U.S. Pat. No. 5,575,719, which is a divisional application of U.S. application Ser. No. 08/209,169 filed Feb. 24, 1994, now U.S. Pat. No. 5,501,463, which is a continuation application of U.S. application Ser. No. 07/979,712 filed Nov. 20, 1992, now abandoned.

All of these documents are incorporated by reference herein in their entireties.

FIELD OF THE INVENTION

The present invention relates to a monitor system with optical wavelength discrimination and fluorescent markers. More particularly, the present invention relates to a system for monitoring kinematics of golf equipment and a method for use thereof.

BACKGROUND OF THE INVENTION

Devices for measuring golf ball flight characteristics and club head swing characteristics are known. For example, the golf ball or golf club head may be marked with at least one contrasting area, used to generate optical images that may be used to determine performance characteristics. Some of these devices use retro-reflective tape or paint markers. Retro-reflective markers, however, result in a raised surface when placed on the golf ball and effect flight performance of the golf ball. It would therefore be desirable to provide a system which measures the launch or flight characteristics of a golf ball using markers that did not substantially effect the flight performance of the golf ball. In addition, paint or ink-based markers and devices are ineffective in bright sunlight and do not provide sufficient optical discrimination of markers.

Devices for measuring two sports objects in a single swing are known, however, these systems have drawbacks relating to outdoor functionality, portability, accuracy, and ease of use. Thus, a need exists for a monitor system to capture club motion data and ball motion data where the system is portable, easy to use, accurate, and adaptable for outdoor use.

SUMMARY OF THE INVENTION

The present invention is directed to a method and apparatus for measuring the flight characteristics of an object using fluorescent optical markers. In particular, one embodiment contemplates a monitor system for measuring flight characteristics of an object, such as a golf ball and/or a golf club, with fluorescent markers. The flight characteristics are derived from data taken when the object is in a predetermined field-of-view. The system preferably includes at least a lighting unit with a light filter and at least one camera unit with a camera filter. The lighting unit directs light in the direction of the object. This light is filtered through a light filter or produced from a narrow wavelength light source, e.g., light emitting diodes, to allow only selected wavelengths of the light to contact the object. The filtered light illuminates the object causing the fluorescent markers on the object to exhibit fluorescence, and thus producing a reflected light at a longer wavelength than the light emitted from the light source. The camera unit is pointed toward the object. The camera filter inhibits the passage of all wavelengths except those in a selected range so that only a portion of the reflected light passes through the camera filter and is transmitted to the camera.

In one embodiment, the camera is a CCD camera with about 90,000 pixels or greater. In another embodiment, the camera has about 300,000 pixels or greater. In yet another preferred embodiment, the camera has about 1,000,000 pixels or greater.

The monitor system may further include a second camera unit pointed toward the object. The second camera unit also has a camera filter.

In one embodiment, the camera filter is a band pass filter. The bandwidth of the band pass filter may be about 60 nm or less; preferably about 30 nm or less, and more preferably about 15 nm or less.

The light filter for use with the present invention may be a low pass filter. In one embodiment, the low pass cut off wavelength is at least 10 nm less than the center wavelength of the camera band pass wavelength. In another embodiment, the low pass cut off wavelength is at least 20 nm less than the center wavelength of the camera band pass wavelength. In one embodiment the light filter passes wavelengths of light less than 580 nm. Filters may have transmission of about 50 percent or greater, preferably about 70 percent or greater. In one embodiment, the filter transmission is about 85 percent or greater.

In one embodiment of the present invention, the fluorescent marker is an orange-fluorescent pigment with a peak transmission around about 600 nm. In yet another embodiment, the monitor system also includes a computer that generates data from images produced by the camera units. These images result from the reflected light that reaches each camera through its camera filter.

The present invention is also directed to a combination of an object, having at least one fluorescent marker, and a monitor system. The monitor system includes a discrete wavelength lighting unit and at least one camera unit. In one embodiment, a first light exits the lighting unit through a light filter towards the object so that only a portion of the first light passes therethrough to the object.

Alternatively, a light source that produces discrete wavelengths or a narrow spectrum of light, e.g., light emitting diodes, may be used. The first filtered light illuminates the fluorescent markers to produce an emission of a second light in the direction of the camera unit at a longer wavelength.

In one embodiment, the camera unit includes an associated camera filter through which the second light travels. Only a portion of the second light passes through the associated camera filter, thereby producing a second filtered light transmitted to the camera.

The present invention is also directed to a method for monitoring an object. The method includes the step of providing the object with at least one fluorescent marker. The method further includes directing a first light in the direction of the object, then filtering the light. The filtered light is reflected off of at least one fluorescent marker to produce a second light in the direction of at least one camera unit. One embodiment further includes filtering the second light to produce a second filtered light, and transmitting the second filtered light to the camera unit.

According to another embodiment of the present invention, the invention is a combination of at least two objects and a monitor system for measuring data for the objects in a predetermined field-of-view. The first object includes at least one first marker with a first reflectance spectra. In one embodiment, the second object includes at least one second marker with a second reflectance spectra significantly different from the first reflectance spectra. The monitor system includes at least one camera pointed toward the predetermined field-of-view. Each camera may further include a switchable filter so that at a first time the filter has a first center wavelength and at a second time the filter has a second center wavelength.

The present invention is also directed to a method of calculating club motion data and ball motion data using a monitor system. The method includes the steps of providing a club with at least one first marker with a first reflectance spectra; providing a ball with at least one fluorescent marker; and directing a light in a predetermined field-of-view. In one embodiment, the method further includes the steps of: reflecting the light off the at least one first marker to produce a first-reflected light; filtering the first-reflected light with a switchable filter at a first wavelength to produce a first filtered light; transmitting the first filtered light to a camera at a first and second time; changing the switchable filter to a second wavelength; reflecting the light of the at least one second marker to produce a second-reflected light; filtering the second-reflected light with the switchable filter set at the second wavelength to produce a second filtered light; and transmitting the second filtered light to the camera at a third and fourth time.

The present invention is also directed to a monitor system for measuring data for a club and a ball moving in a predetermined field-of-view. The system includes at least one camera with a filter pointed toward the predetermined field-of-view. Each camera obtains at least two club images in the predetermined field-of-view, and obtains at least two ball images in the predetermined field-of-view. The system may further include a computer to determine club motion data from the club images and ball motion data from the ball images.

BRIEF DESCRIPTION OF THE DRAWINGS

FIG. 22 is a top view of the system of FIG. 21 and generally showing calibration of the system;

FIG. 23 is a side elevation view of the system of FIG. 21; and

DETAILED DESCRIPTION OF THE INVENTION

Figure 1:
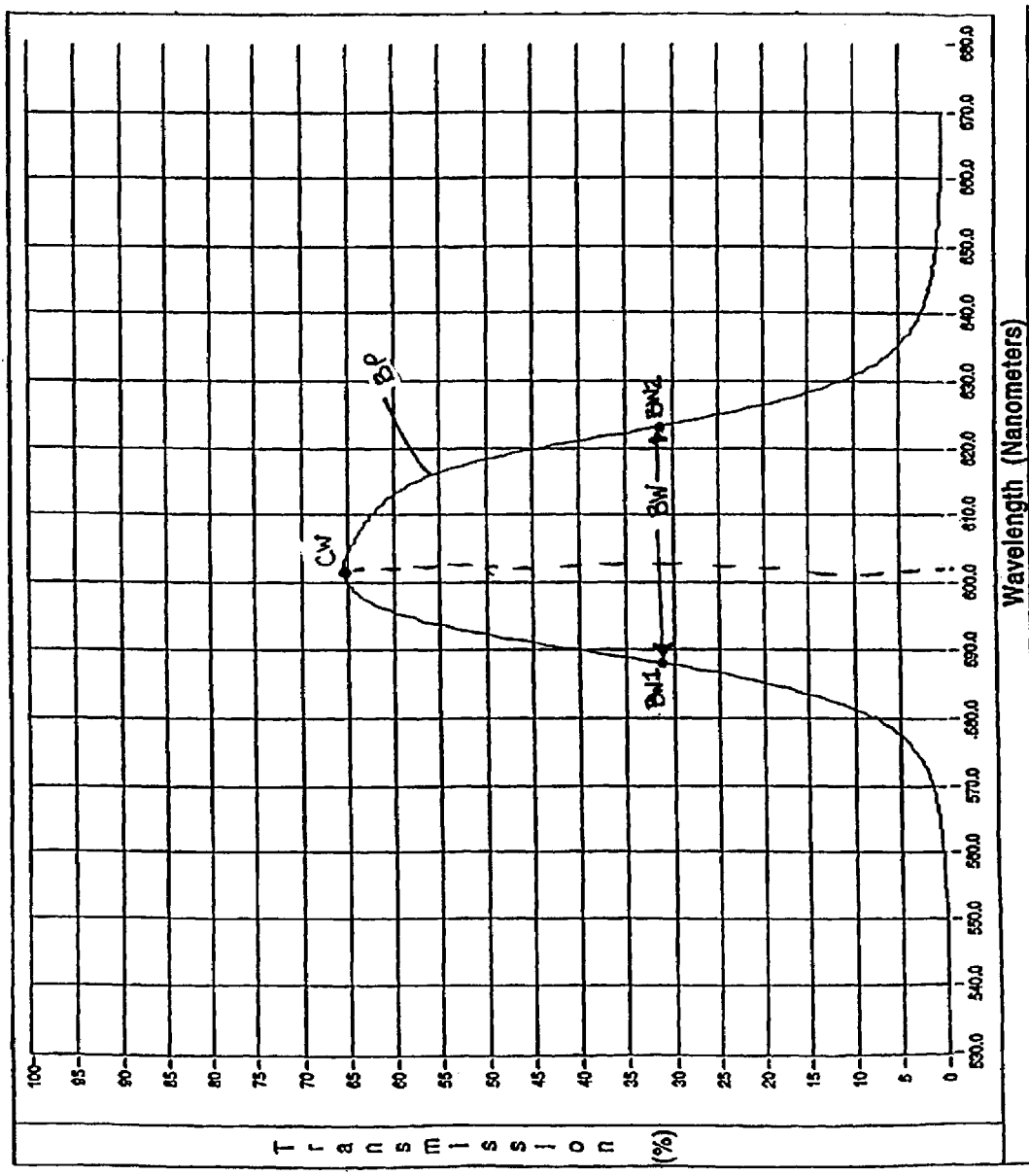
FIG. 1 is a graph showing transmission curves of a band pass camera filter with a center wavelength of 605 nm and bandwidth of 34 nm.

The present invention is related to a portable and accurate method and apparatus for measuring golf performance. In particular, the kinematic characteristics of an object are measured, such as a golf ball and a golf club, using at least one fluorescent marker, camera, filter, and central processing unit. The camera, lighting system, and markings on the object allow measurements, at discrete time intervals, of an object's position and orientation in a predetermined field-of-view.

The apparatus includes at least one lighting unit, used to direct light in the direction of the object and filtered through at least one light filter, or otherwise controlled, to allow only selected wavelengths of the light to contact the object, and at least one camera unit, with at least one camera filter, configured to point toward the object. The light illuminates the object to cause the fluorescent markers to reflect light toward the camera. The camera filter allows only a portion of the reflected light to pass through the camera filter and be transmitted to the camera at selected moments in time. Optionally, a narrow spectrum light source may be used to eliminate the need for a filter on the lighting unit. Narrow spectrum light sources preferably include light emitting diodes.

The activation of the system is initiated through the use of a trigger that may respond to object position or sound. In response to the trigger signal, a first image of the golf ball and/or golf club in the predetermined field-of-view is taken. The actuation of the cameras are controlled through shuttering electronics and via strobes used to take a picture of the object several times. For example, if the camera sensing element is active for 1 ms (1000 microseconds (μs)), the strobe may fire two times, preferably once at t=0 and again at about t=800 μs, producing, or "burning" two images of the markers on the camera's CCD. The camera system also includes a computer and monitor to process image data and determines the launch conditions of the object. Alternatively, an electronic shutter may be opened and closed rapidly, and a strobe light, remaining constant, may be used to acquire images of the markers at two discrete time intervals.

In one embodiment, the trigger communicates via an asynchronous protocol with the camera to control activation. In another embodiment, the cameras and strobes are controlled and communicate using an IEEE 1394 bus. Control and communication using the IEEE 1394 bus, or the like, advantageously eliminates complex cables and allows for a compact, lightweight monitor system. Another embodiment includes a wireless communication device, which advantageously eliminates cables and allows for a compact and lightweight monitor system. The wireless communication device enables remote control and visualization of data acquired by the camera system. The equipment for use in such a wireless connection is known in the communications arts. Preferably, the data rate transfer for such wireless transmission is about 5 Mb/s or greater. More preferably, the data transfer rate is about 10 Mb/s or greater. Still more preferably, the data rate transfer is 100 Mb/s or greater. A preferred communication protocol is IEEE 802.11. A cellular network, as well as other wireless networks, may also be used. If the monitoring equipment is connected to a common power source, a system such as the PowerLine system available from Linksys, which also alleviates the requirement for separate communication lines or wires, may be used. The computer and monitor of the camera system may also be connected via a wireless connection. The trigger used in one embodiment of this system is an acoustic trigger.

Although an acoustic trigger is used as the primary example to explain the system of the invention, a position-sensing trigger, e.g., an optical trigger, such as a laser or other apparatus, can also be used to initiate the system. For example, a light beam and a sensor system may be used so that when the golf ball or club moves through the light beam, the sensor sends a signal to the system. When a laser is used, the laser may be arranged such that a trigger is initiated as soon as the ball moves. For example, the laser may be directed or trained toward the teed golf ball and the first image may be taken as or shortly after the golf ball leaves the tee. An example of a suitable commercially available laser-based optical trigger is Model LV-H32 available from Keyence Corporation of New Jersey.

The Camera

The camera used is preferably an electro-optical camera with a light-receiving aperture, shutter, and light sensitive silicon panel. One example of such a camera is discussed in U.S. Pat. No. 5,575,719. Suitable commercially available cameras include, but are not limited to, Sony XCD-X700 (available from Sony Electronics Inc., Park Ridge, N.J.) and DragonFly (available from Point Grey Research, Vancouver, B.C.). A charge coupled device ("CCD") camera is preferred, but TV-type video cameras are also useful. In one embodiment, cameras based on CMOS technology are used. As discussed, the cameras may communicate through and be controlled by an IEEE 1394 bus or the like.

In one embodiment, the camera has a digital resolution of about 90,000 pixels or greater. In another embodiment, the camera has a digital resolution of about 300,000 pixels or greater, preferably, about 1,000,000 pixels or greater.

More than one camera may be used in the present invention. In an embodiment with a dual camera system, for example, the cameras are preferably asynchronous with external triggering capability and each have a digital resolution of about 100,000 pixels or greater, preferably about 500,000 pixels or greater. Additionally, cameras having the digital resolution values described in the preceding paragraph may also be used.

The camera is directed and focused on a predetermined field-of-view in which a golf ball moves and is imaged. The camera has a field-of view larger than necessary to image just a single golf ball. Thus, when using more than one camera, the predetermined field-of-view is the cameras' fields-of-view at the location where the cameras' lines-of-sight intersect. The angle between the cameras' lines of sight should be from about 0° to about 40°, preferably from about 10° to about 30°.

The optical shuttering systems used in the present invention may have an electronic device to successively control, i.e., activate and passivate, the influence of light on the camera. A non-limiting example of such a shutter is a ferroelectric liquid crystal shutter. Preferably, the time required to open and close the shuttering system is less than about 100 μs.

The camera may be electrically connected to a microprocessor and a computer and monitor.

The Camera Filter

The camera may be fitted with a filter to create greater contrast between the illuminated markers and other objects in the field-of-view. The filter used in the present invention is preferably a band pass filter used to inhibit wavelengths of light in selected ranges. The filter used in the present invention preferably has a center frequency, or center wavelength, around about 600 nm. Depending on the bandwidth of the filter used, e.g., 2, 10, 20, 40 nm, also referred to as filter precision, wavelengths of light from about 560 nm to about 640 nm may be allowed through the filter.

For example, FIG. 1 shows a transmission curve for a band pass filter, labeled BP. The horizontal axis of the graph is the emission wavelength in nanometers (nm) for light and the vertical axis of the graph is the transmission value in percentage of total light (e.g., a transmission of 100 percent would signify no loss of light and no absorbency by the filter). The peak transmission of about 65 percent occurs at an emission wavelength of about 605 nm, labeled point CW, or the center wavelength. Bandwidth of the filter is determined at a 50% reduction of the peak transmission. For the curve BP, the 50% reduction of the peak transmission occurs at about 32% transmission, or about 588 nm, labeled as point $BW_1$, and about 622 nm, labeled as point $BW_2$. The width of the peak from point $BW_1$ to point $BW_2$ is about 34 nm, labeled BW. Therefore, all wavelengths of light less than about 588 nm and greater than 622 nm are significantly diminished via the band pass filter. Narrow bandwidths are preferred for bright light applications, such as outdoor use.

In one embodiment, the camera filter used in the system of the invention is an orange-interference filter preferably mounted in front of the camera(s). Suitable filters include those from Andover Corporation of Salem, N.H. and Edmund Scientific Corporation of Tonawanda, N.Y.

In another embodiment, a switchable filter is used. A recommended switchable filter is electronic and can change from a filter of one color to a filter of a different color in a short period of time. In one embodiment, the switchable filter is an optical filter with colors that are electronically tunable with a response or turning time of less than about 500 μs, more preferably a response time of less than about 50 μs, with no moving parts or vibration. In another embodiment, the switchable filter has a transmissibility about 60 percent or greater, preferably about 80 percent or greater.

In one embodiment, the switchable filter is able to alternate between three primary colors, e.g., an RGB filter that is switchable between red, green, and blue. A Varispec VS-RGB-GP liquid crystal tunable filter may be used to enable switching between a red filter and a green filter in about 250 μs. When a Varispec filter and a black-and-white camera is used, the filter may be mounted in any suitable way as to situate the filter between the camera lens and the camera.

The Lighting Unit

The lighting unit used in the system of the invention may be a dual strobe lighting unit. The strobe light unit includes at least one flash bulb assembly, the related circuitry, and a cylindrical flash tube. Preferably, the circuits used with the strobe light unit are similar to those disclosed in U.S. Pat. No. 6,011,359, the entire disclosure of which is incorporated herein by reference. In one embodiment, the dual strobe lighting unit includes two Vivitar Automatic Electronic Flash Model 283 strobe lights. In another embodiment, the system uses a dual strobe flash unit, such as those available from Unilux Inc., Saddle Brook, N.J. In yet another embodiment, the flash unit is an LED strobe, such as commercially available Model 5380 available from Illumination Technologies Inc., East Syracuse, N.Y. One skilled in the art would appreciate that the lighting units described herein are exemplary of the light sources for use with the present invention without limiting or restricting the use of other light sources.

In one embodiment of the invention, strobe lights are mounted to sequentially direct light, preferably filtered light, onto the predetermined field-of-view. The distance from the lighting unit to the object is preferably about 60 inches or less, and more preferably about 30 inches or less. Short light bursts are desirable to prevent elongation of optical markers. In one embodiment, the duration of the light for a single burst may be less than about 100 μs, preferably less than about 30 μs.

Alternatively, a flash unit with a single bulb and two separate discharge circuits may be used. Once the trigger signals the microprocessor, the strobe lighting unit sets off successive flashes and provides at least two bursts of light separated by less than about 2000 μs. In another embodiment, the at least two bursts of light are separated by less than about 1000 μs.

The energy in a single burst of light may be greater than about 1.5 joules, and more preferably may be greater than about 3.0 joules; most preferably greater than 6 joules.

Preferably, the strobe light communication and control is performed via a wireless connection, an IEEE 1394 bus, or the like. The delay between an external asynchronous trigger signal and the activation of the first light burst, as well as the delay time between successive light bursts, is dictated by software on the control computer and is transmitted to the strobe unit via the wireless connection or 1394 bus prior to activation.

The Lighting Filter

The filter used with the lighting system is mounted in any suitable way in front of the lighting unit to create a first filtered light. It is preferred that the excitation wavelength is distinct from the marker emission wavelength. While one skilled in the art would readily appreciate that there are several ways to accomplish this, one example is using a lighting filter chosen to have a cut off wavelength less than the center wavelength of the camera filter. This allows for definitive contrast between the emission wavelength and the excitation wavelength and, therefore, only the emitted light, i.e., the marker(s), will be imaged by the camera. The excitation light, i.e., the strobe light, would not be able to pass through the camera filter because the wavelength would not meet the filter's pass criteria.

In one embodiment, the lighting filter is a low pass filter with a cut off wavelength of at least about 10 nm less than the lower end of the marker emission wavelength. For example, the low pass filter would have a cut off wavelength of about 10 nm or less than point $BW_1$, as previously described regarding FIG. 1. In particular, if the band pass filter used with the camera has a central emission wavelength of about 605 nm and a bandwidth of about 34 nm, the low pass filter used with the lighting system should have a cut off wavelength of about 580 nm or less (FIG. 1). Any cut off wavelength is acceptable providing the excitation and emission wavelength curves do not intersect near the center wavelengths of the respective curves.

The excitation wavelength preferably has a peak transmission at a center frequency or wavelength around about 450 nm. Lighting filters of the invention preferably have transmission of about 50 percent or greater, more preferably about 70 percent or greater. In one embodiment, the filter transmission is about 85 percent or greater.

Figure 2:
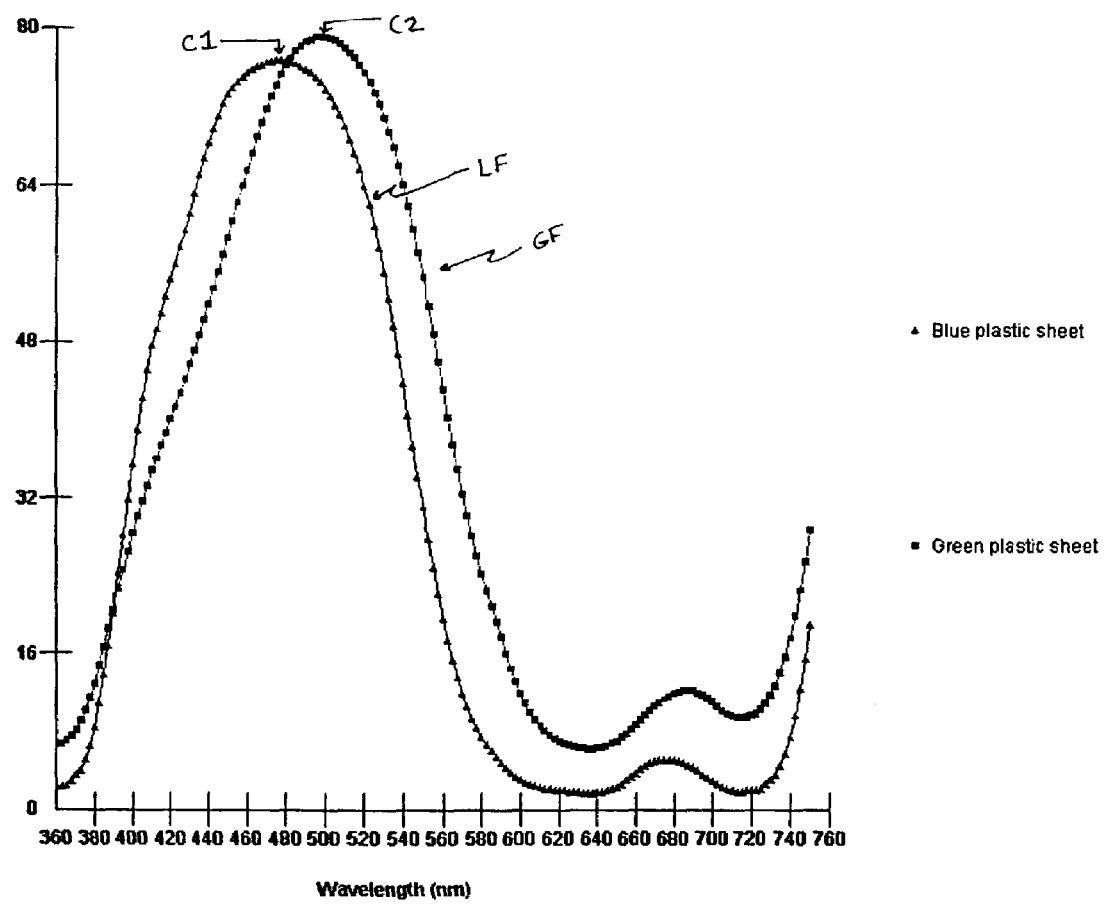
FIG. 2 is a graph showing transmission curves of low pass filters with cut off wavelength of about 560 and about 580 nm.

FIG. 2 shows an example transmission curve for a lighting filter of the present invention, labeled LF. The horizontal axis of the graph is the excitation wavelength in nanometers (nm) for light and the vertical axis of the graph is the transmission value, or excitation light emitted, in percentage of total light. The lighting filter curve LF shows a high transmission of about 79 percent occurring at point C1 with an excitation wavelength of about 460 nm. A transmission curve for a comparison green filter, labeled GF, is included for comparison purposes only. This curve shows how a higher transmission (occurring at point C2) in the emission wavelength range (about 500 nm) negatively affects the contrast of the image because of the high degree of overlap with the emission wavelength curve.

The Marker

Fluorescent markers include pigments or dyes that release electromagnetic radiation while absorbing another form of energy, but cease to emit the radiation immediately upon the cessation of the input energy. For example, the fluorescent markers useful with the present invention may obtain excitation energy from the lighting unit but cease to fluoresce as soon as the lighting unit is no longer functioning. This feature may be beneficial in the present invention. For example, this phenomena enables dual strobing to capture two discrete groups of markers on a single image frame with minimal blurring that might result from a slow decay of fluorescence.

Fluorescent markers may be identified by spectral emission tests. Spectral emission tests may be performed using, for example, the MacBeth Color-Eye 7000A in the specular excluded and UV included modes. Fluorescent markers typically have reflectance values exceeding 100 within the visible spectrum.

When a fluorescent marker is used with the present invention, the marker is preferably made of orange-fluorescent pigment, although other pigments may be used. The orange-fluorescent pigment can be from a variety of sources, for example, those manufactured by Dayglo Corporation of Cleveland, Ohio, Binney & Smith of Easton, Pa. (LIQUITEX®), and Kuretake Company of Japan.

Figure 3:
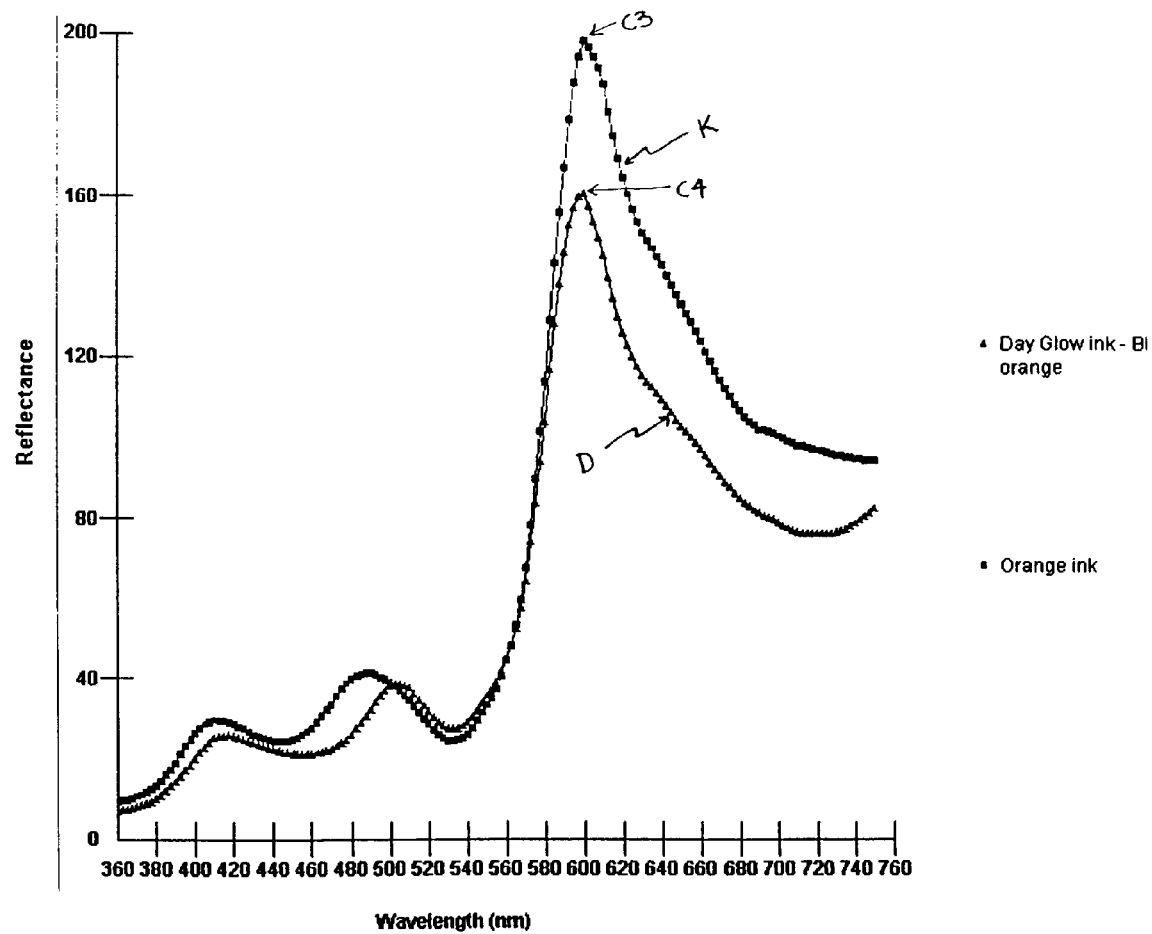
FIG. 3 is a graph showing a reflectance curve for two alternative fluorescent markers.

FIG. 3 shows reflectance curves for two orange-fluorescent pigments. FIG. 3 has a reflectance curve labeled D for the Dayglo pigment and a reflectance curve labeled K for the Kuretake pigment. The horizontal axis of the graph is a wavelength in nanometers (nm), and a vertical axis of the graph is a reflectance indicating the percentage of the light reflecting for a given wavelength. Reflectance is the amount of light that reflects off a given marker. For the Kuretake pigment (curve K), the highest or primary reflectance of about 200 percent occurs at point C3 with a wavelength of about 600 nm. For the Dayglo pigment (curve D), the highest or primary reflectance of about 160 percent occurs at point C4 with a wavelength of about 600 nm. Thus, the Kuretake pigment has better reflectance than the Dayglo pigment, however, either can be used in the system of the present invention. The curves K and D have the greatest reflectance over a range from about 560 nm to about 640 nm, and centered at the primary wavelength of about 600 nm.

The marker(s) can be applied to the golf ball or golf club using any suitable method known to those of ordinary skill in the art, e.g., pad printing, foil transfer, marking pens, and spray painting.

When monitoring a golf club and a golf ball simultaneously, it is preferred that the markers for the club and ball are distinguishable from each other. This may be accomplished by using markers of different sizes, shapes orientation, peak optical reflective wavelengths, or any combination thereof. Additionally, different types of markers for the club and the ball may be used. For example, the club may be marked with a fluorescent marker and the ball may be marked with a retro-reflective marker. Another example would be to use a diffuse-reflective circular marker on the ball and a triangular fluorescent marker on the club.

In one embodiment, the club marker has a first reflectance spectra and the ball marker has a second reflectance spectra. In another embodiment, the first reflectance spectra has a first primary response wavelength and the second reflectance spectra has a second primary response wavelength. In another embodiment, the first and second primary response wavelengths are separated by about 50 m or greater. In yet another embodiment, the first and second primary response wavelength are separated by about 100 nm or greater. In one embodiment, the first primary response wavelength is 500 nm or greater, and the second primary response wavelength is about 600 nm or greater.

At least one marker should be used on the golf equipment, although it is preferred that at least two markers are used. In general, the markers should be positioned so that they reflect light from the golf ball or club in the predetermined field-of-view back to the camera(s) used to capture the images. In one embodiment, six or more markers are used on a golf ball and three or more markers are used on a golf club.

The placement of the markers on the golf ball or club can be changed in ways known to those of ordinary skill in the art. A non-limiting example, shown in FIG. 4, includes a golf ball 60 having six reflective markers, 60*a-f*, thereon. The marker 60*f* is centrally located on the ball and the markers 60*a-e* are disposed thereabout. The angle between the non-central markers 60*a-e* is designated as β. It is recommended that the angle β is between about 10° and about 40°. Most preferably, the angle β is about 30°. Although six markers are shown, a single line or as few as two markers or as many as eleven markers can alternatively be used on the ball.

Golf balls spin when struck with a golf club, and at some angle of rotation the pattern of markers 60*a-f* will yield identical images. Calculation of spin rate is accomplished by computing the angular rotation of a ball through the use of at least two images of the ball taken at a known time interval. If the ball rotates through one of the symmetric orientations during the interval, then errors will occur in calculating the rotation angle and, consequently, in the computed spin rate. A typical pattern of markers is symmetric when rotated through and an angle of 72°. Therefore, use of a pattern of markers that enlarges the rotation angle between symmetric images would be beneficial. Preferably, the pattern is symmetric only after being rotated through an angle of rotation for symmetric images α that is greater than 72°.

Figure 15:
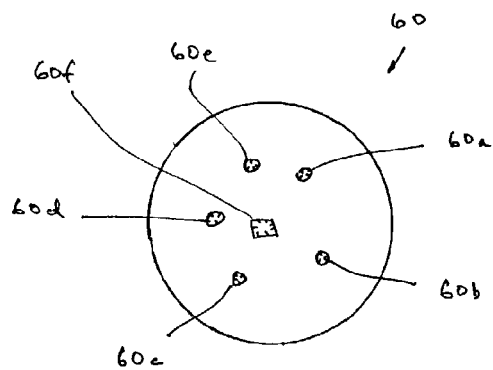
FIG. 15 is a view of a golf ball for use according to one embodiment of the invention.

FIG. 15 shows another example of an arrangement of markers 60*a-f* on a golf ball 60. The marker 60*f* is centrally located on the ball 60 and the markers 60*a-e* are disposed thereabout. The central marker 60*f* is square shaped, thus making an angle of rotation for symmetric images α of 90°.

Figure 16:
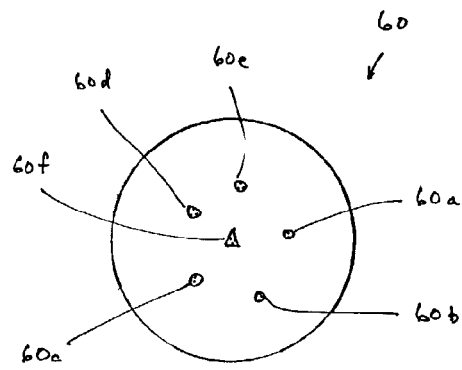
FIG. 16 is a view of a golf ball for use according to one embodiment of the invention.

FIG. 16 shows another example of an arrangement of markers 60*a-f* on a golf ball 60. The marker 60*f* is centrally located on the ball 60 and the markers 60*a-e* are disposed thereabout. The central marker 60*f* is triangle shaped, thus making an angle of rotation for symmetric images α of 120°.

Figure 17:
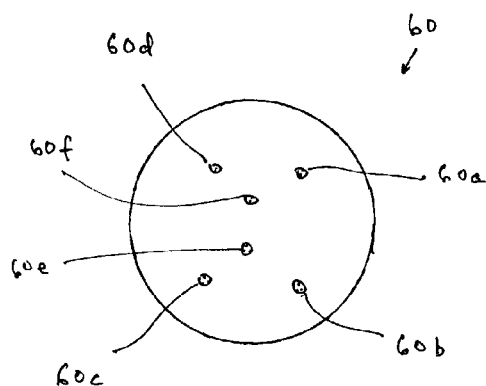
FIG. 17 is a view of a golf ball for use according to one embodiment of the invention.

FIG. 17 shows another example of an arrangement of markers 60*a-e* on a golf ball 60. In this arrangement, there are two markers 60*e*, 60*f* centrally located on the ball. Markers 60*a-d* are disposed about the central markers 60*e*, 60*f*. The position of centrally markers 60*e*, 60*f* make an angle of rotation for symmetric images α of 180°.

Figure 18:
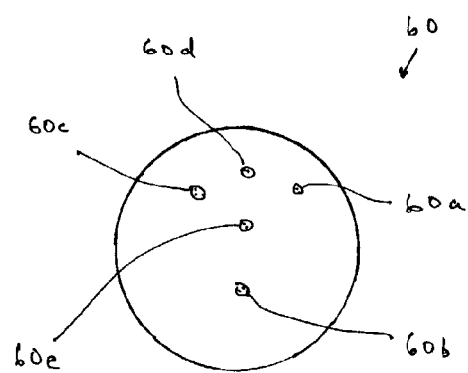
FIG. 18 is a view of a golf ball for use according to one embodiment of the invention.

FIG. 18 shows another example of an arrangement of markers 60*a-e* on a golf ball 60. The marker 60*e* is centrally located on the ball 60 and the markers 60*a-d* are disposed thereabout. The markers 60*a-d* are disposed in an asymmetric manner, with markers 60*a*, 60*c*, and 60*d* being disposed toward one side of central marker 60*e* and marker 60*b* being disposed on an opposite side of central marker 60*e*. This arrangement yields a angle of rotation for symmetric images α of 360°. This, of course, is the maximum possible angle of rotation for symmetric images.

Figure 5:
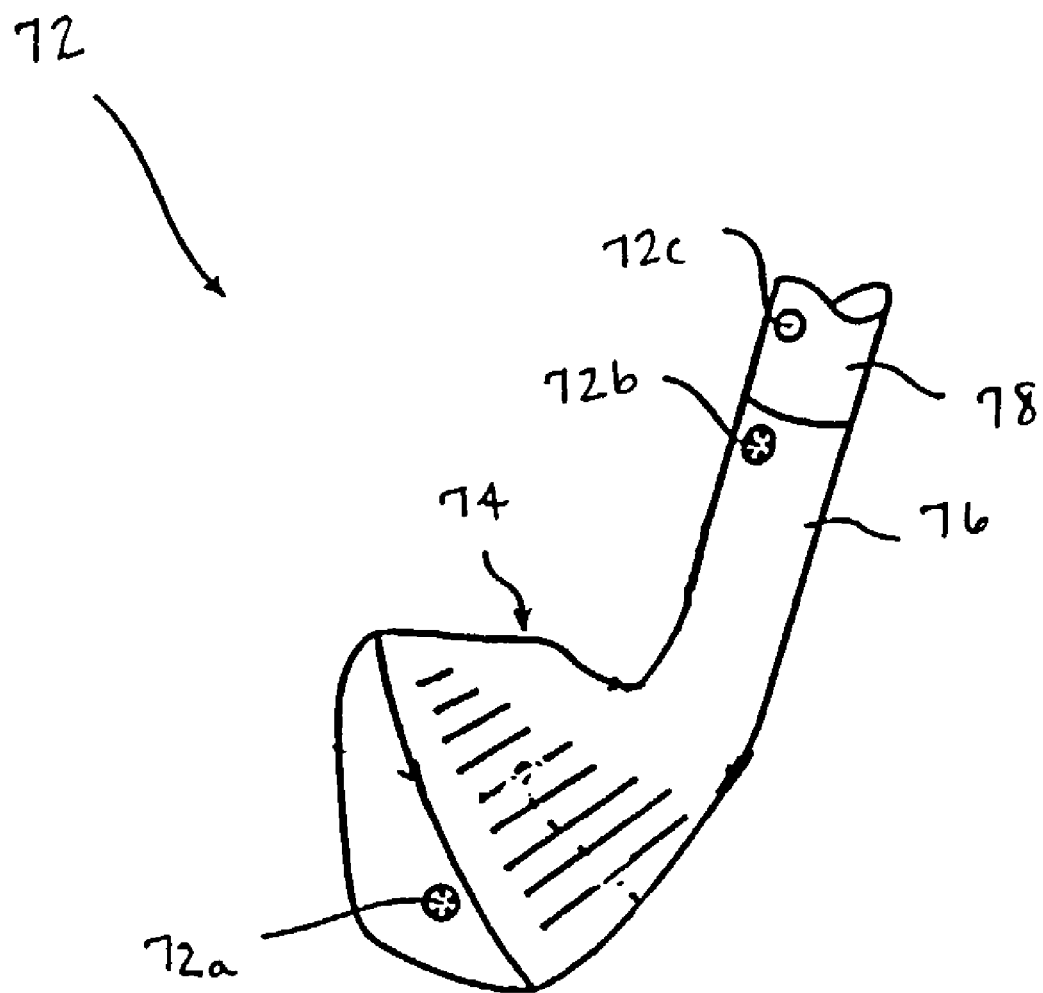
FIG. 5 is an enlarged, perspective view of a club head for use according one embodiment of the present invention.

Another non-limiting example of marker placement, shown in FIG. 5, includes a golf club 72 with a club head 74, a hosel 76, and a shaft 78. Three reflective markers, 72*a-c*, are placed at designated places on the club: 72*a* is located on the toe of the club head 74; 72*b* is located on the free end of the hosel 76; and 72*c* is located on the shaft 78. Alternatively, two markers can be placed on the toe and one on the hosel, or one marker can be placed on the toe and two markers can be placed on the hosel. Any arrangement of the markers on the golf ball or golf club is acceptable providing that the markers can reflect light back to the camera system.

As shown in FIG. 5, markers 60*a-f* and 72*a-c* may be rounded or circular in shape. If circular markers are used, it is preferred that the diameters of the markers are from about 0.05 inches to about 0.25 inches, more preferably about 0.1 inches to about 0.2 inches, and most preferably about 0.18 inches. The markers of the invention, however, are not limited to a circular shape, specific size, or diameter shown in the example.

The Monitor

The monitor used in the system may be an electronic character or graphical display that can be viewed outdoors. In one embodiment, the monitor display has an optical intensity of at least 500 candela per square meter (nit). The display may also be a liquid crystal display (LCD) or light-emitting diode (LED) display. In the embodiment using the LCD, the LCD preferably utilizes super twisted nematics (STN) or thin film transistor (TFT) technology.

In one embodiment, a touch screen is used to overlay a bright LCD panel. The operation of the touch screen system is based on capacitive, resistive, or optical techniques. In this embodiment, the operator may use the touch screen to display, store, or send collected kinematic data or to adjust system parameters prior to and after collecting the kinematic data.

Wireless Connection

In use, the camera unit and lighting unit are placed near the person being measured. The monitor and computer may preferably be located a distance away from the golfer. A preferred embodiment of the invention includes a wireless communication device so that wires or cables do not have to be connected between the equipment positioned adjacent the golfer and the equipment controlling the system and displaying the measured data. The wireless communication device enables remote control and visualization of data acquired by the camera system and eliminates complex cables and allows for a compact, lightweight monitor system. This setup advantageously allows the system to be used in a wide variety of locations and conditions. This setup also advantageously facilitates connection to other display devices, such as a large screen for use during demonstrations.

The equipment for use in such a wireless connection is known in the communications arts. Preferably, the data rate transfer for such wireless transmission is greater than 10 Mb/s. Still more preferably, the data rate transfer is greater than 100 Mb/s. A preferred communication protocol is IEEE 802.11. The computer and monitor of the camera system may also be connected via a wireless connection.

The System

Figure 6:
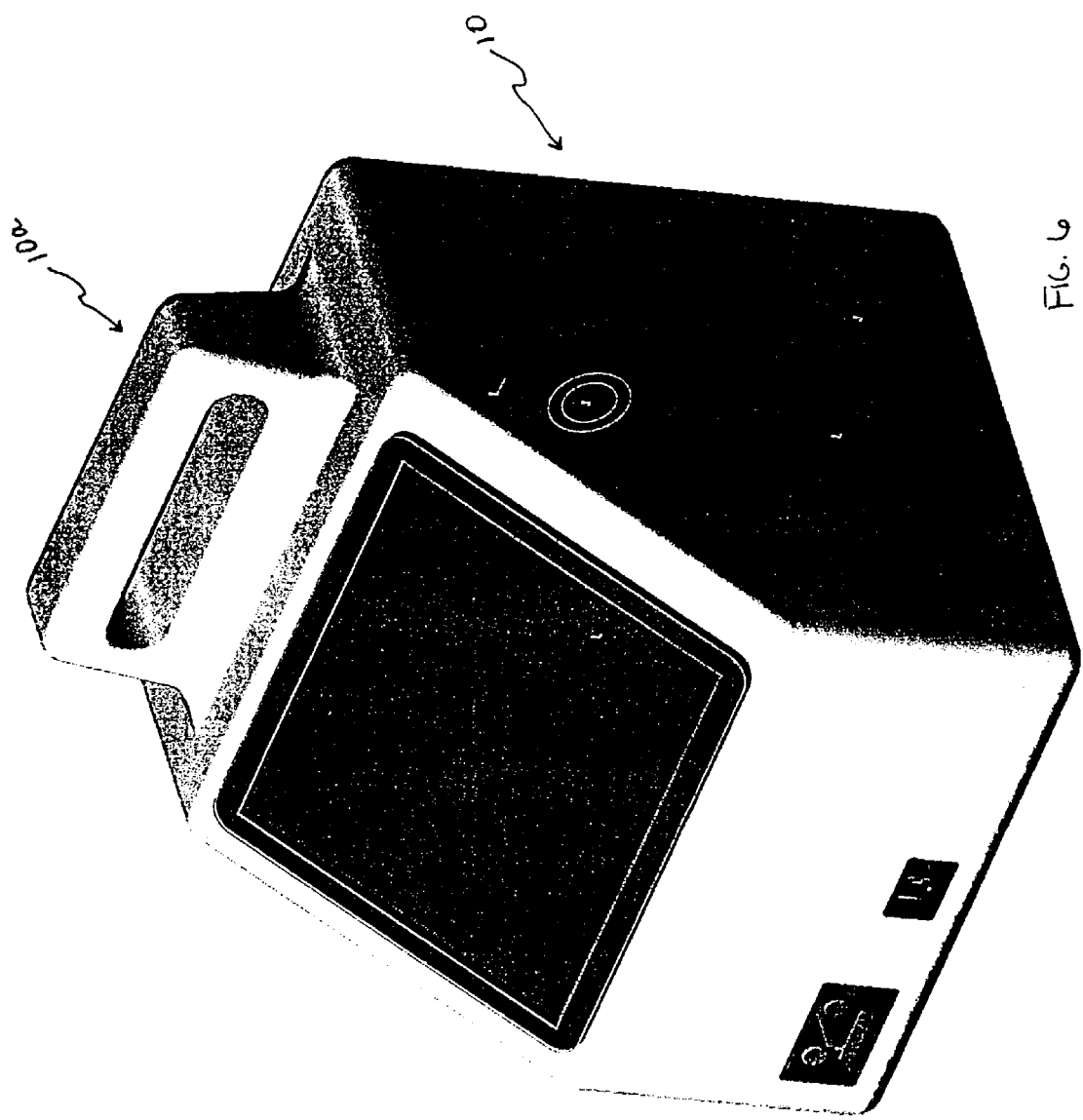
FIG. 6 is a perspective view of the portable system of the invention.

Preferably, the system of the invention weighs less than about 50 pounds and more preferably weighs less than about 25 pounds. In addition, preferably, the physical volume of the system is less than about 2 cubic feet. The entire system 10 (i.e., the camera, filters, lighting unit, central processing unit, and display) may be contained within a single housing capable of being carried with a handle 10a (shown in FIG. 6).

Figure 7:
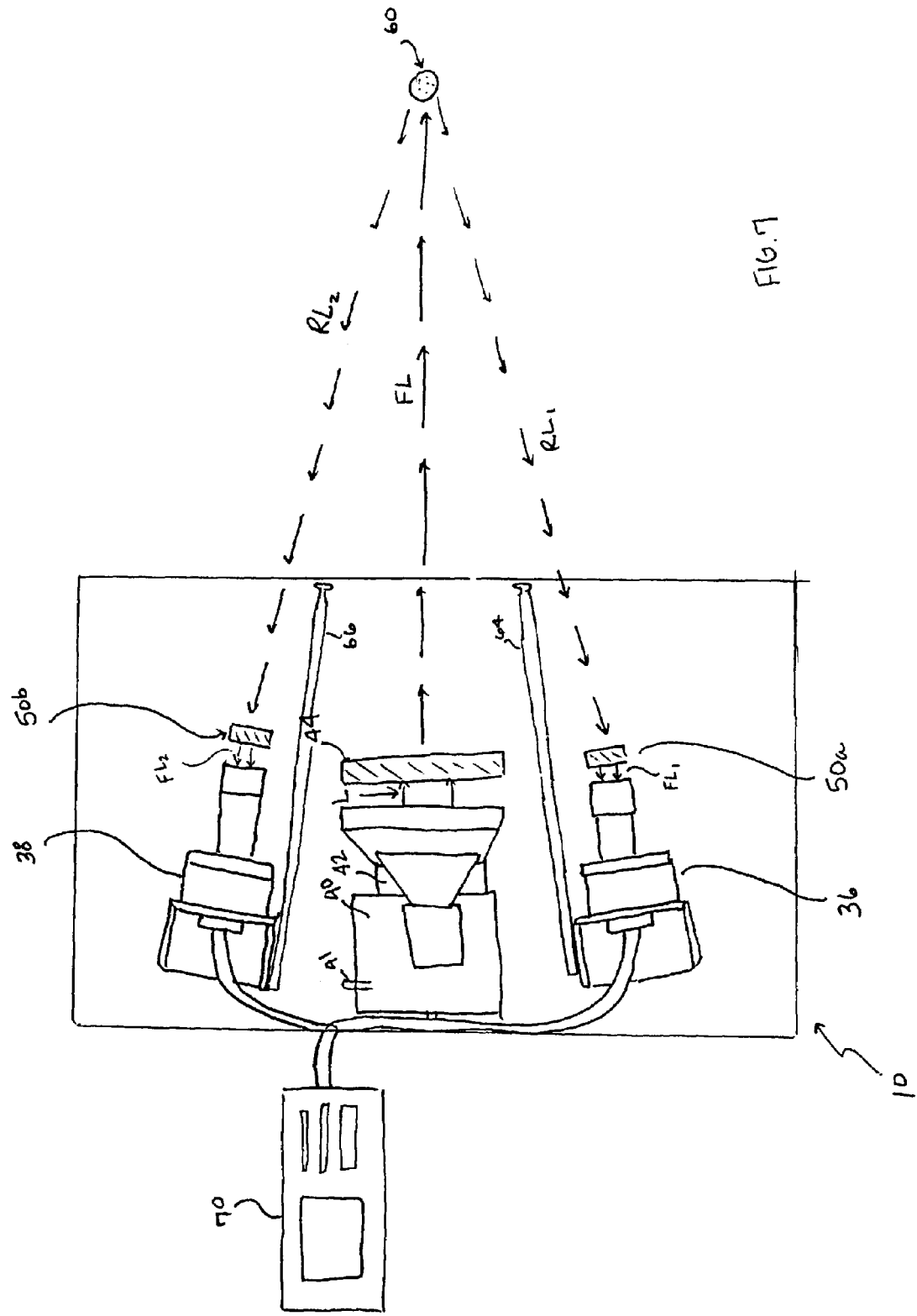
FIG. 7 is a top view of one arrangement of the system according to the present invention.

One suitable arrangement of the system, a portable, dual-camera monitoring system, is shown in FIG. 7. Other arrangements of the system, briefly discussed here, and fully detailed in co-pending U.S. patent application Ser. No. 09/782,278, include dual-camera systems, single camera systems, and systems for monitoring both the golf ball and the golf club simultaneously. Examples of other system arrangements are discussed in U.S. Pat. No. 6,241,622, the disclosure of which is incorporated in its entirety herein.

Monitoring system 10 includes a lighting box 40 and camera units 36, 38. In this embodiment, the lighting box 40 contains a centrally disposed trigger 41 and a dual strobe lighting unit 42. In other arrangements of the system, the trigger may be separate from the lighting unit. Filter 44 is disposed in front of the dual strobe lighting unit 42. Cameras 36, 38 are directed to the predetermined field-of-view, for example toward golf ball 60. Camera filters 50a, 50b are disposed in front of cameras 36, 38.

A single camera system is similar to system 10, however, the system includes a single camera unit, a single filter, an adjacent trigger contained in a lighting box, and a light source.

A ball camera and club camera system allow for simultaneous golf club and golf ball monitoring.

The system is similar to system 10, however, the system may also include a club monitor, a ball monitor, a microprocessor, and a computer and monitor. The club monitor includes a first club camera, a spaced second club camera, and a lighting box. Club filters are disposed in front of each club camera. The club monitor further includes a strobe light unit and a trigger within the lighting box. The ball monitor is similar to the club monitor and includes a first ball camera, a spaced second ball camera, and a lighting box. The ball monitor further includes a strobe light unit within the lighting box and ball filters are disposed in front of each ball camera.

In this arrangement, the club filters are preferably different colors from the ball filters. For example, the club filters can be red and the ball filters can be green. Such club filters allow the club cameras to view the strobe flashes, as reflected from the markers, in a red wavelength and such ball filters allow the ball cameras to view the strobe flashes, as reflected from the markers, in a green wavelength.

Another arrangement of the system, detailed in U.S. patent application Ser. No. 09/782,278, includes a strobe lighting unit with four capacitors and at least one camera unit that is preferably a black-and-white CCD camera with a switchable filter with placement in front of the camera, as previously discussed. This arrangement includes at least one club motion sensor, the number of sensors corresponding with the number of cameras. The sensors are preferably photoelectric sensors manufactured by Tritronics and preferably used with a reflective mount as described in U.S. patent application Ser. No. 09/782,278.

Figure 19:
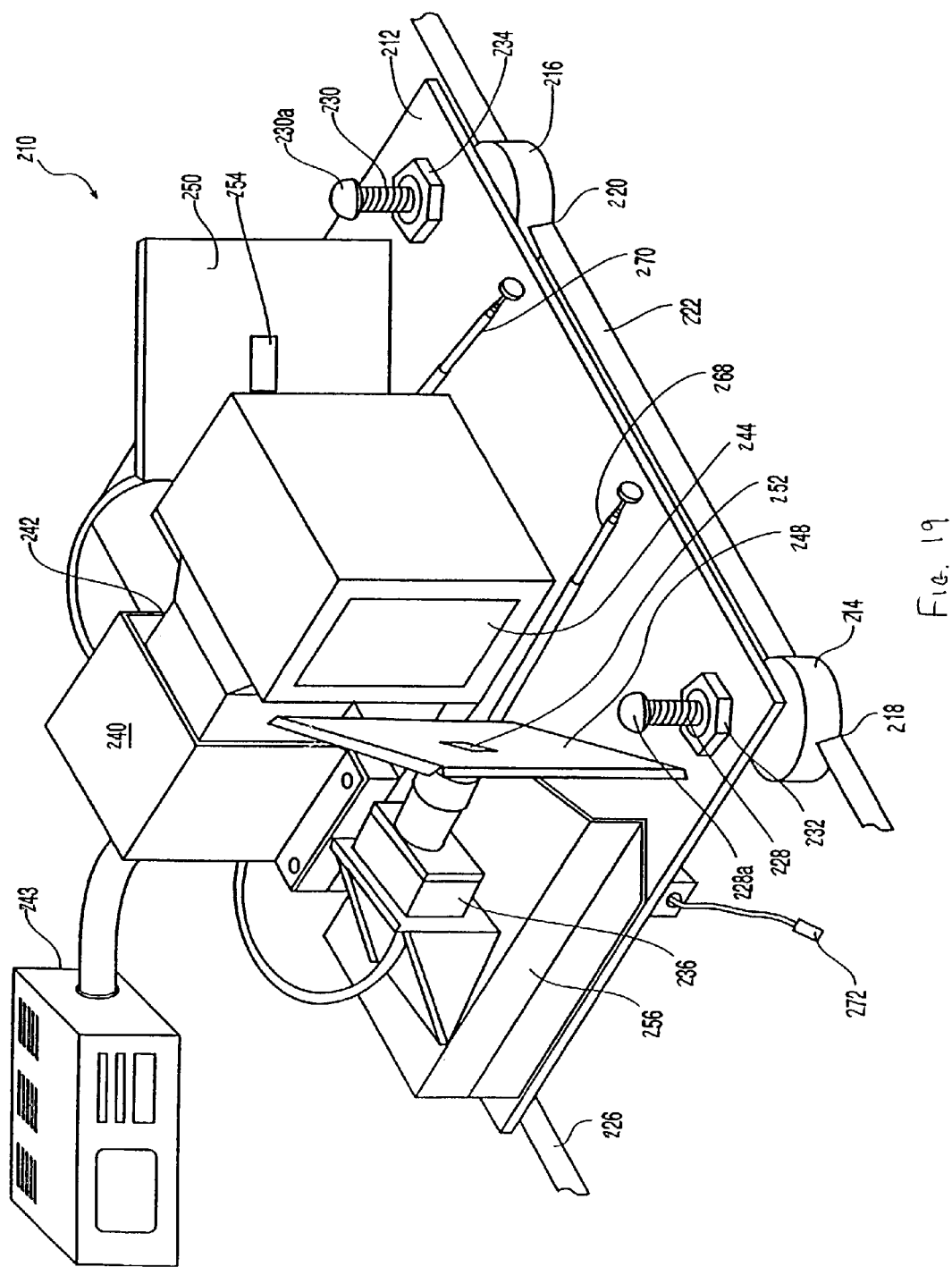
FIG. 19 is a perspective view of another arrangement of the system according to the present invention.

FIG. 19 illustrates a preferred first embodiment of the invention in the form of a portable launch monitoring system 210 including a base or support structure 212 and attached support elements 214, 216. Support elements 214, 216 are specifically shown as slide pads each including V-shaped notches 218, 220, which allow the pads 214, 216 to slide along a rod 222. Another slide pad 224 attached to the system 210 at the rear similarly slides along a rod 226. One or more slide pads 214, 216, and 224 may be replaced by other support elements with different configurations or methods of moving, such as wheels. By the term "slide pads," applicants intend to cover any elements allowing the system 210 to slide or move back and forth relative to a predetermined field-of-view. Slide pads 214, 216 include a height adjustment feature allowing the front corners of system 210 to be raised or lowered for leveling purposes. Specifically, each slide pad 214, 216 is attached to support structure 212 by respective threaded rods 228, 230 and nuts 232, 234 fixed to the support structure 212. Rods 228, 230 each include a drive portion 228a, 230a that may be used to adjust pads 214, 216.

Launch monitoring system 210 further includes first and second camera units 236, 238, a centrally disposed control box 240, and a dual strobe lighting unit 242. First and second camera units 236, 238 are preferably ELECTRIM EDC-1000U Computer Cameras from Electrim Corporation in Princeton, N.J. Charge coupled device or CCD cameras are preferred but TV-type video cameras are also useful. The angle between the two cameras' line of sight is preferably in the range of 10°-30°, with 22° being most preferable. Each of the cameras 236, 238 has a light-receiving aperture, shutter, and light sensitive silicon panel 239. The cameras are directed and focused on a predetermined field-of-view in which a golf ball moves and is imaged. A trigger 272 may be included with system 210.

The control box 240 communicates via a communication method discussed above with the camera units 236, 238 to control their activation and the dual strobe lighting unit 242 to set off the successive flashes. Dual strobe lighting unit 242 includes two strobe lights mounted on top of one another. These strobe lights sequentially direct light onto a beam splitter 243 and then out of the unit through windows 244 and 246 to reflective elements or panels 248, 250 and then to the predetermined field-of-view. Panels 248, 250 may be plates formed of polished metal, such as stainless steel or chrome-plated metal. Other light reflective elements may also be used without departing from the spirit or scope of the invention. Each reflective panel 248, 250 includes an aperture 252, 254. Cameras 236, 238 are fixed on support structure 256, 258 and are thereby disposed with their respective lenses 260, 262 directed to the predetermined field-of-view through apertures 252, 254. Video lines 264, 266 feed the video signals into control box 240 for subsequent use.

The locations of the strobe lights, beam splitter, reflective elements and cameras allow the light directed from the strobe to enter the field-of-view and be reflected back from the ball, due to the reflective dots, to the camera lenses through the apertures. In another embodiment, ring-shaped strobe lights can be used which surround each camera lens. Since the ring-shaped strobe lights are positioned close to the lenses and the center axis of the strobe is aligned with the center of the lenses, the light once reflected off the markers would enter the lenses. Thus, eliminating the need for the reflective elements.

Preferably, telescoping distance calibrators 268, 270 are affixed to support structure 212. The telescoping members are used in calibrating launch monitoring system 210 at the appropriate distance from an object to be monitored. Distance calibrators 268, 270 are extendable members for example conventional radio antennae can be used. Calibrators 268, 270 are used in conjunction with a calibration fixture 370, shown in FIG. 24.

Figure 21:
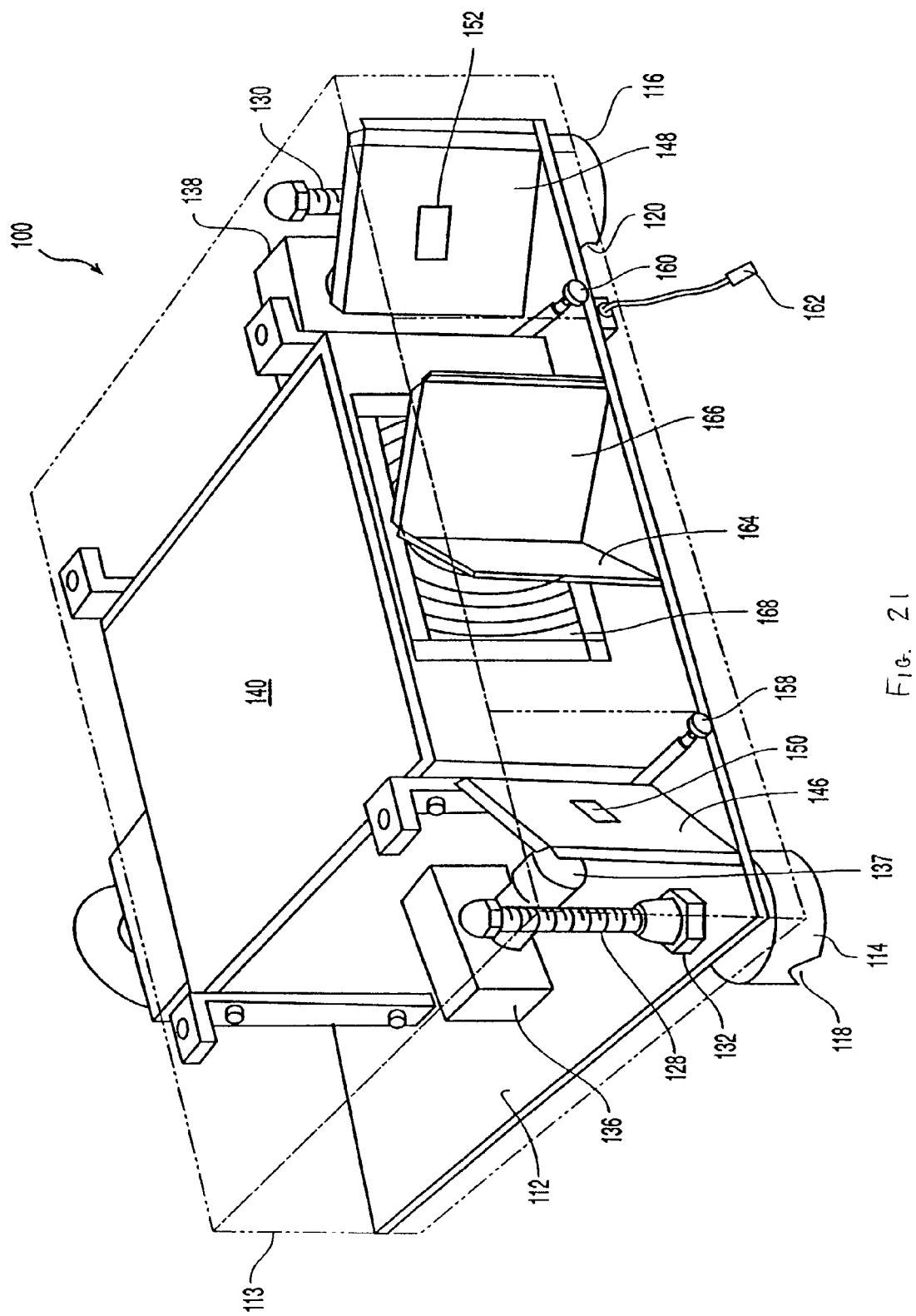
FIG. 21 is a perspective view of another arrangement of the system according to the present invention.

FIGS. 21-23 illustrate another embodiment of the present invention that further reduces the size and therefore increases the portability of the system.

Figure 20:
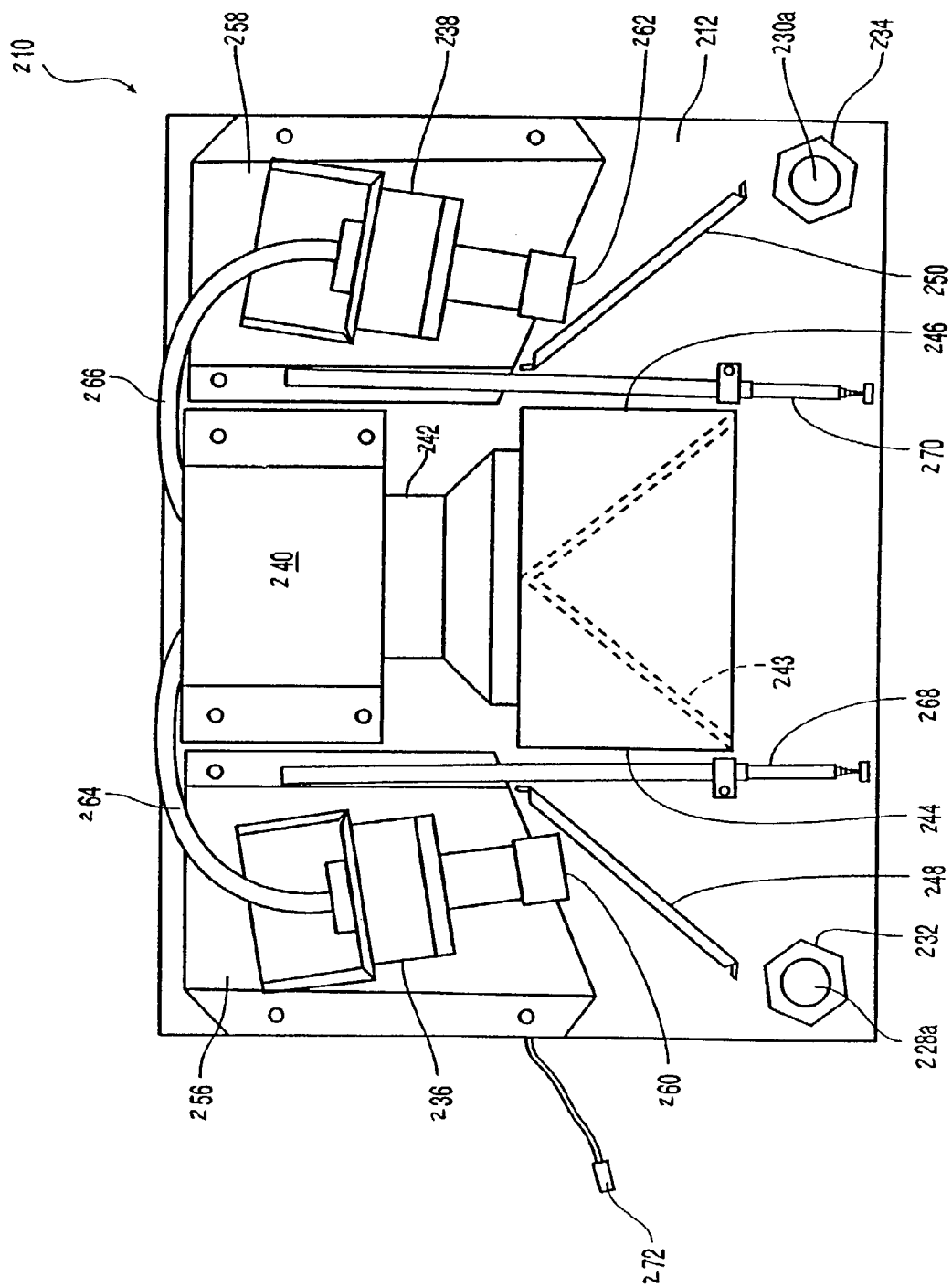
FIG. 20 is a top view of the system of FIG. 19.

Launch monitoring system 100 includes a base or support structure 112 that may also have a cover 113. Slide members or pads 114, 116 are utilized at a lower front portion of support structure 112 and include notches 118, 120 for receiving a rod 190 along which pads 114, 116 may slide. As shown in FIGS. 22 and 23, wheels 122, 124 may replace the pad 24 disclosed with respect to the embodiment shown in FIGS. 19 and 20. Wheels 122, 124 are attached for rotation and to support structure that includes a handle 126 for allowing an operator to move launch monitoring system 100 back and forth along the ground. This embodiment also includes threaded rods 128, 130 and respective nuts 132, 134 for allowing height adjustment at the front of launch monitoring system 100. The wheels may also be height adjusted relative to the support 112 to allow the system 100 to be adjusted depending on the terrain on which the system is placed. A computer and monitor are preferably used, and may be combined into a single element or be separate elements. The computer has several algorithms and programs used by the system to make the determinations discussed below.

As further shown in FIGS. 21 and 22, first and second camera units 136, 138 are affixed to support structure 112. These electro-optical units 136, 138 are preferably smaller than those disclosed above and are preferably the ELECTRIM EDC-1000HR Computer Cameras available from the Electrim Corporation in Princeton, N.J. The cameras also have light-sensitive silicon panels. The cameras 136, 138 each have a line-of-sight that is directed to and focused on the predetermined field-of-view. The cameras' fields-of-view are larger than are necessary to image just a single golf ball. Thus, the predetermined field-of-view is the cameras' fields-of-view at the location where the cameras' lines-of-sight intersect.

Figure 24:
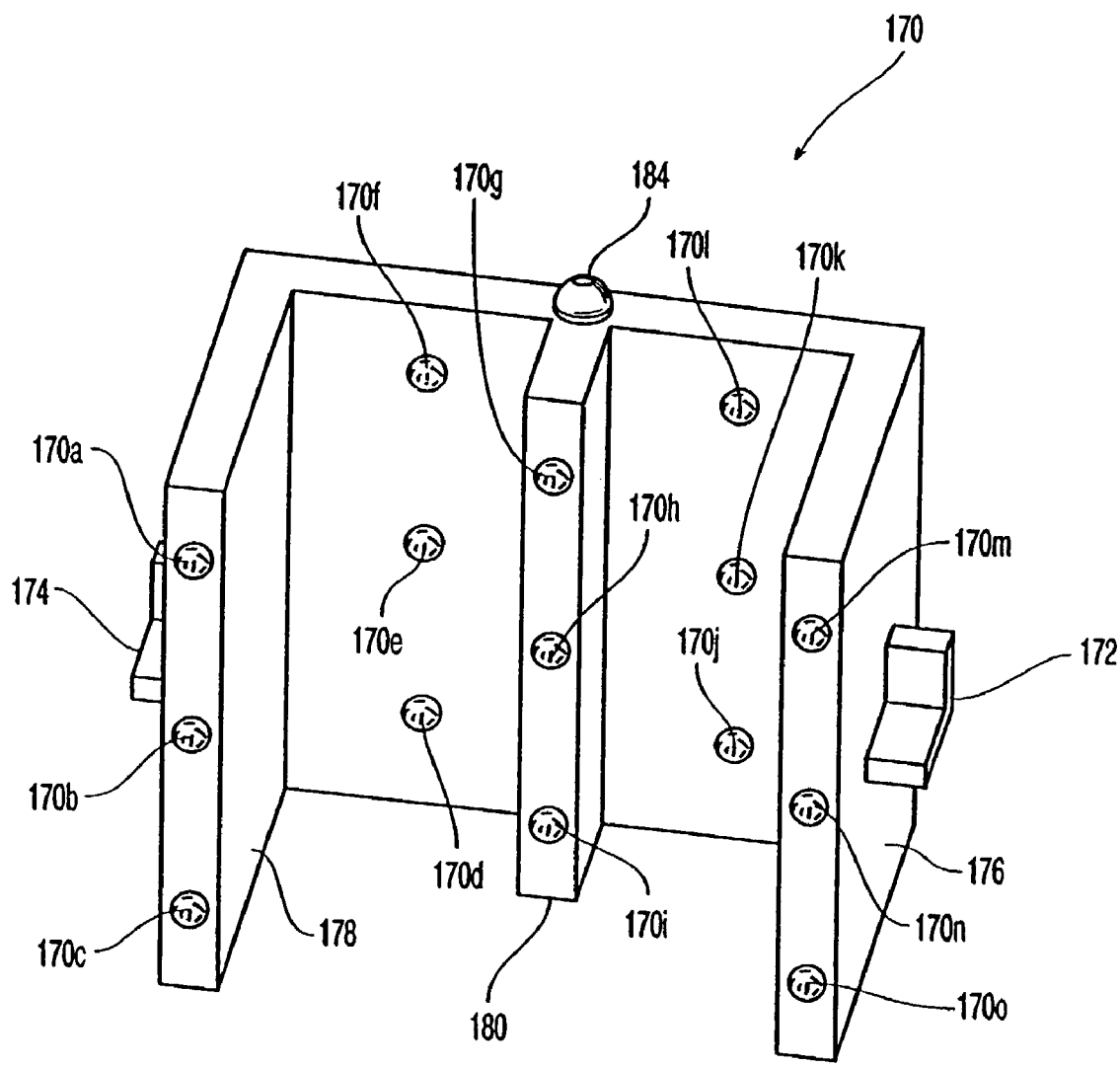
FIG. 24 is a perspective view of a calibration fixture for use with the system according to the present invention.

As shown in FIG. 24, a calibration fixture 170 is provided to calibrate the system. The fixture 170 includes receiving elements or tabs 172, 174 extending outwardly from outer legs 176, 178 for receiving an end portion of the distance calibrators 158, 160. When positioned at this location in accordance with the distance calibrators 158, 160, a central leg 180 of fixture 170 is disposed at the proper location for a golf ball 182 used in a launch monitoring operation. Golf ball 182 also has a pattern of reflective dots. Calibration fixture 170 further includes an optical level indicator 184 on a top surface thereof for allowing fixture 170 to be leveled before the calibration procedure. Finally, spikes 186, 188 extending from the bottom of fixture 170 are inserted into the turf to stabilize fixture 170 during the calibration procedure. Fixture 170 may have a pattern of reflective dots 170a-o, as shown in FIG. 24. Applicants have found that only 15 dots (as opposed to the twenty dots used on the calibration fixture of the parent application-application Ser. No. 08/751,447) are necessary. Since the longitudinal movement of the golf ball is greater than its vertical movement during the time between the two images, the calibration of the system need not be as precise in the vertical direction. Therefore, fewer dots in the vertical direction on the calibration fixture are needed to adequately calibrate the system.

Calibration and Operation

Figure 8:
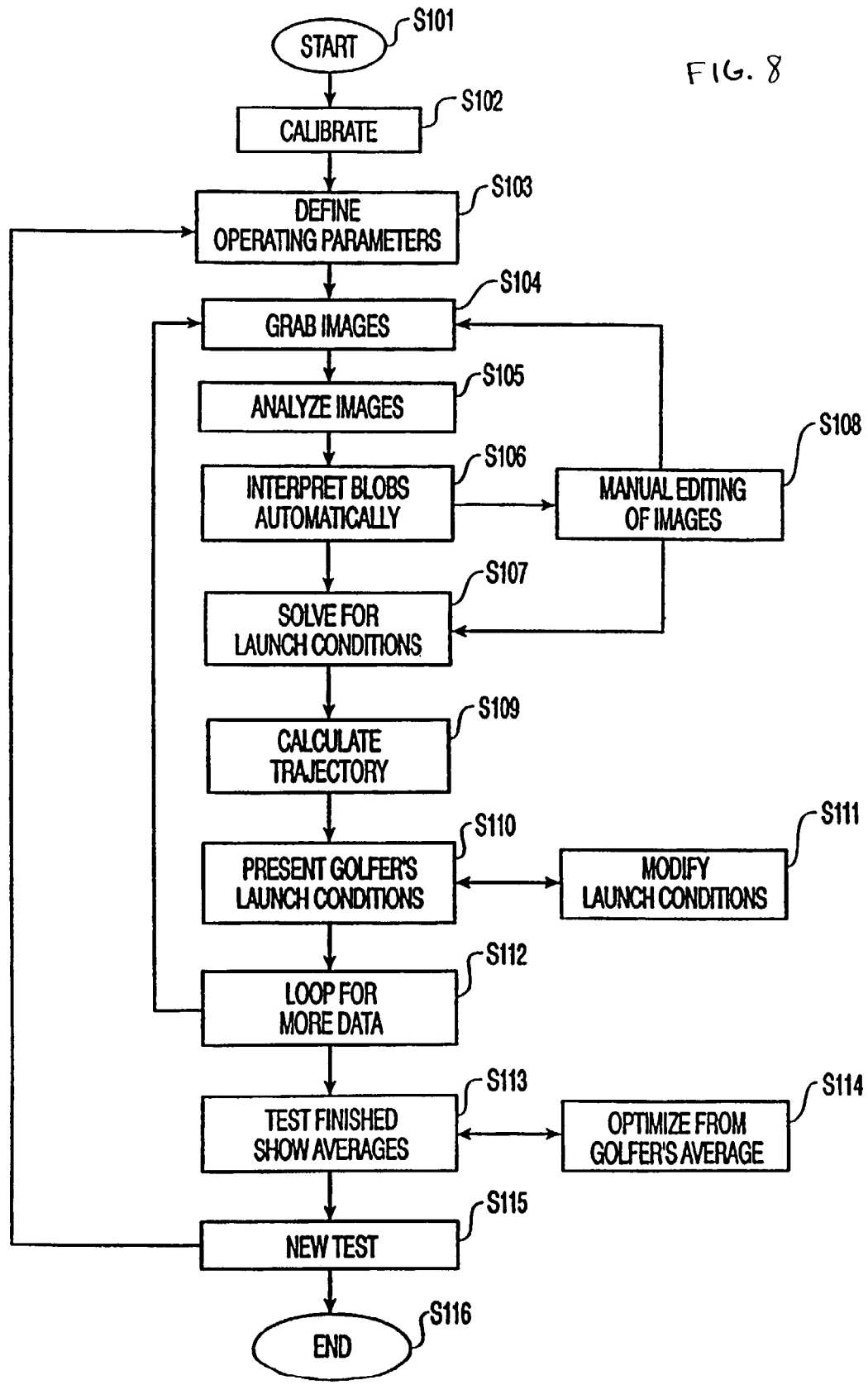
FIG. 8 is a flow chart describing the general operation and calibration of the system of the present invention.

The general calibration and operation of the system is shown in FIG. 8 in steps S101 to S116. The first step (Step S101), the system starts and determines if this is the first time the system has been used. By default, the system uses the last calibration when first activated. Therefore, the system should be calibrated each time it is moved and/or turned on.

After starting up the system, calibration begins to define the coordinate system to be used by the system (Step S102). The details of the calibration step are disclosed in U.S. patent application Ser. No. 09/468,351, now pending. For example, a single camera system may be calibrated through calculation of the distance between dots.

Optional telescoping distance calibrators 64, 66 may also be used in the system 10, as shown in FIG. 7. The telescoping members are used in calibrating the monitoring system 10 at the appropriate distance from an object to be monitored. Distance calibrators 64, 66 are extendable members such as conventional radio antennae.

After the system is calibrated, operating parameters are defined (Step S103), i.e., left- or right-handed orientation depending on the golfer to be tested. The selection of the left-handed orientation requires one set of coordinates to be used for the left-handed golfer while the right-handed system requires the use of another set of coordinates. Step S103 also involves setting the system in either test or demonstration mode. If the test mode is selected, the system saves the test data. In the demonstration mode, the system does not save the data. Additional data specific to the location of the test and the golfer is entered during Step 103. The operator may optionally enter data for ambient conditions, e.g., temperature, humidity, wind speed and direction, elevation, and type of turf to be used in making the calculations for the golf ball flight, roll, and total distance. The operator may also optionally input the personal data of the golfer, e.g., name, age, handicap, gender, golf ball type, and golf club used (type, club head, shaft).

After this data is entered, the system is ready for data collection or demonstration (Step S104). Steps S105-S107 involve the use of several algorithms stored in the system computer to determine the location of the golf ball and/or golf club relative to the monitor. After the computer has determined the location of the golf ball or club from the images, the system (and computer algorithms) determine the launch conditions. These determinations, which correspond to Steps S105, S106, and S107, include locating the bright area(s) in the images, determining which of those bright areas correspond to the marker(s) on the golf ball, and, then using this information to determine the location of the golf ball from the images, and calculate the launch conditions, respectively.

The use of the system may be explained using the dual-camera system of FIG. 7, however, the general concept remains the same when using other variations of the system, for example, a single camera system, a ball and club monitoring system, or a system using a narrow spectrum light source. The trigger 41 communicates to control the activation of the dual strobe lighting unit 42 and cameras 36, 38 to capture images. The dual strobe lighting unit 42 sets off successive flashes and light L is directed through the filter 44 creating a first filtered light FL with a wavelength centered around about 450 nm. Filtered light FL may be directed toward the golf ball 60 and reflected back from the markers, as reflected light $RL_1$ and $RL_2$. $RL_1$ and $RL_2$ pass through camera filters 50a, 50b, respectively, so only portions of $RL_1$ and $RL_2$ are transmitted through as camera filtered light $FL_1$ and $FL_2$, respectively. $FL_1$ and $FL_2$ preferably have center wavelengths of light from about 560 nm to about 640 nm. $FL_1$ and $FL_2$ allow light to pass to the cameras 36, 38, respectively, to produces two images of the ball at positions I and II, as shown in FIG. 9, in a single image frame.

Figure 4:
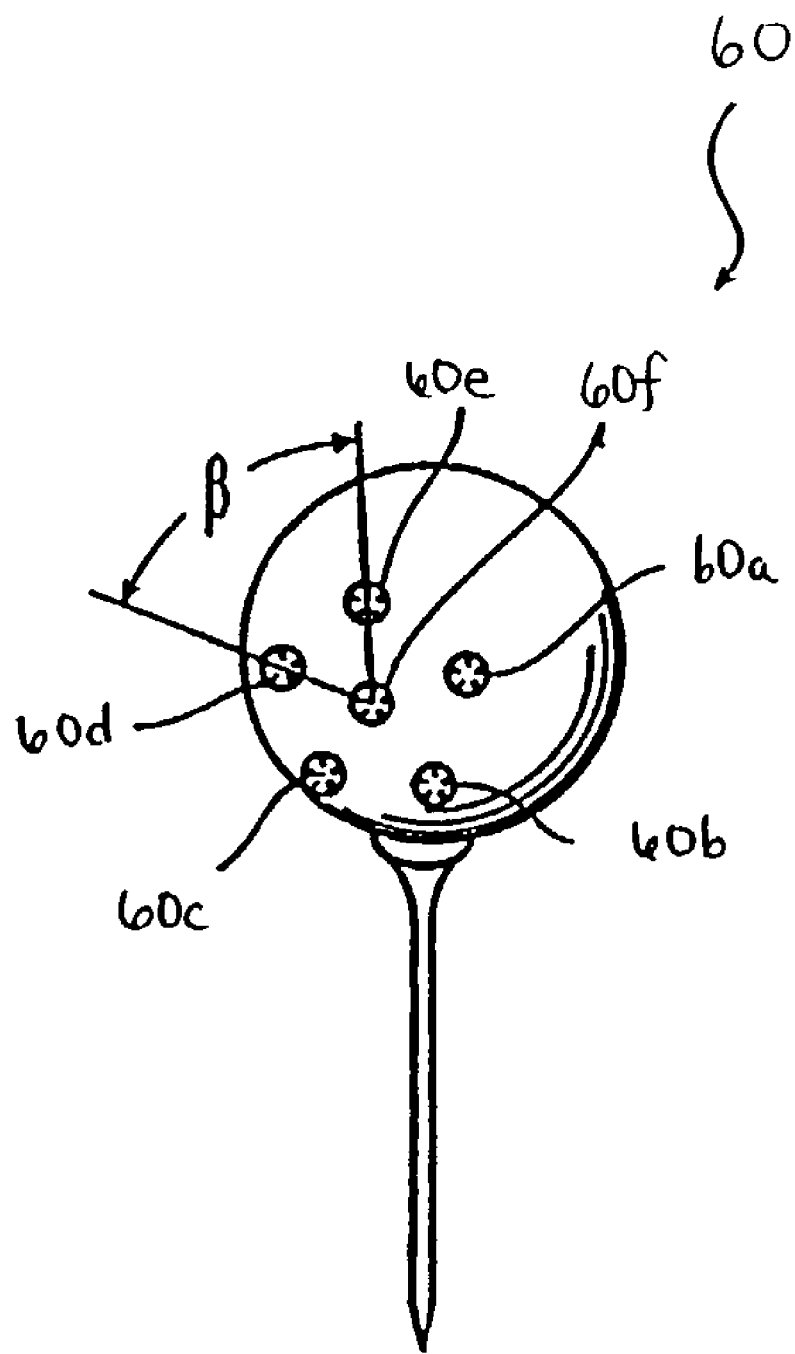
FIG. 4 is an enlarged, perspective view of a teed-up golf ball for use according to one embodiment of the invention.
Figure 9:
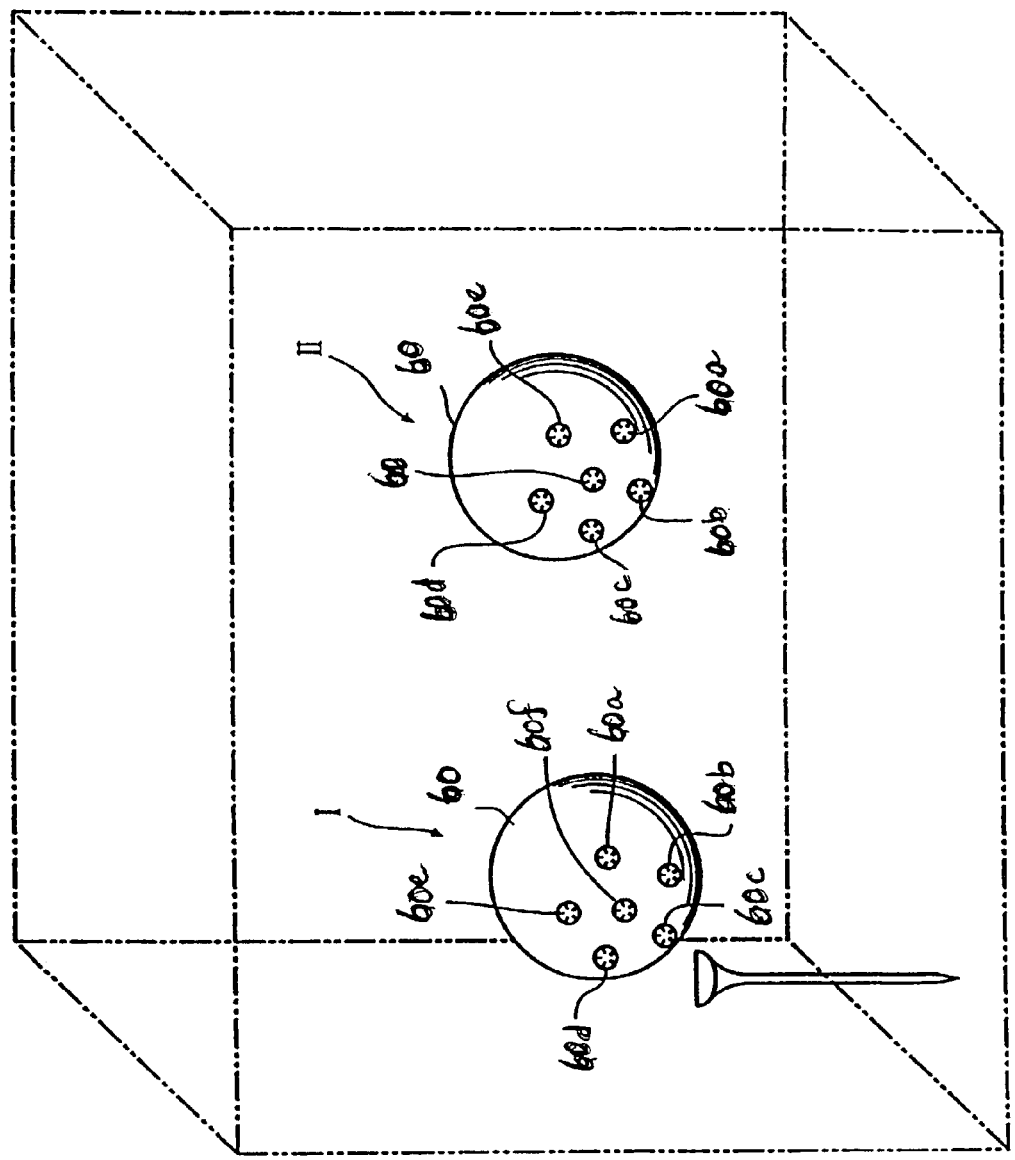
FIG. 9 is a perspective view of a three-dimensional rectilinear field-of-view showing the golf ball at two different positions I and II according to the present invention.

A marked golf ball 60 is shown as described according to FIG. 4, in the three-dimensional, predetermined, rectilinear field-of-view (shown in phantom) of FIG. 9, as imaged after being struck in two positions (I and II) at two distinct points in time. The camera filtered light FL1, FL2 each produce an image of the ball 60 at position I. The strobe light 42 is pulsed so that the filtering sequence above is repeated after a short time interval, preferably about 800 µs, to produce a second ball image 60 at position II.

Figure 10:
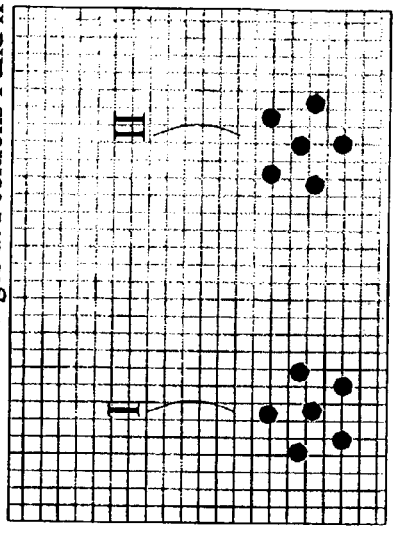
FIGS. 10-13 are graphical representations of pixel maps obtained by the cameras of the system according to one embodiment of the present invention.
Figure 11:
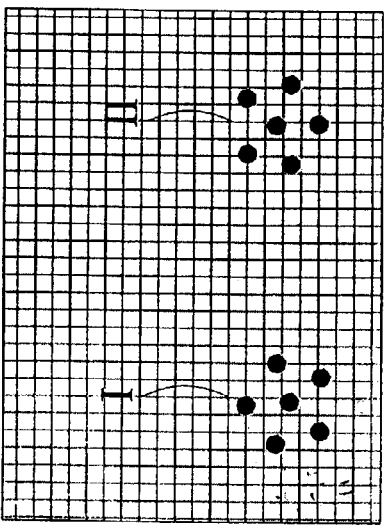

At Step S105, the system analyzes the images recorded by a silicon panel in the camera, by locating the bright areas in the images. FIGS. 10-11 are graphical representations of the pixel maps for both cameras 36, 38. The bright areas in the images, e.g., 60a'-f', correspond to the first filtered light (FL) from the strobe lighting unit reflecting off of the markers as $RL_1$ and $RL_2$, passing through the camera filters 50a and 50b, and coming out as $FL_1$ and $FL_2$.

Although the marker pattern of FIG. 5 was used in this discussion, it will be recognized that other marker patterns—such as those illustrated in any of FIGS. 15-18—could also be used.

Specific to the ball camera and club camera arrangement, Step S104, involves a first swing sensor that sends a signal to the microprocessor to tell the computer to "arm" the ball cameras, during the club back swing, so that they are ready to fire when signaled. "Arming" the ball cameras clears and readies the panel within the CCD camera to be activated. The arming of the ball camera prior to taking images is due to the particular cameras used. If other cameras are used that more quickly clear and ready the panel, this step and an additional sensor may not be necessary. The signal is also sent to the microprocessor so that it is ready for the signal from a second swing sensor.

Figure 14:
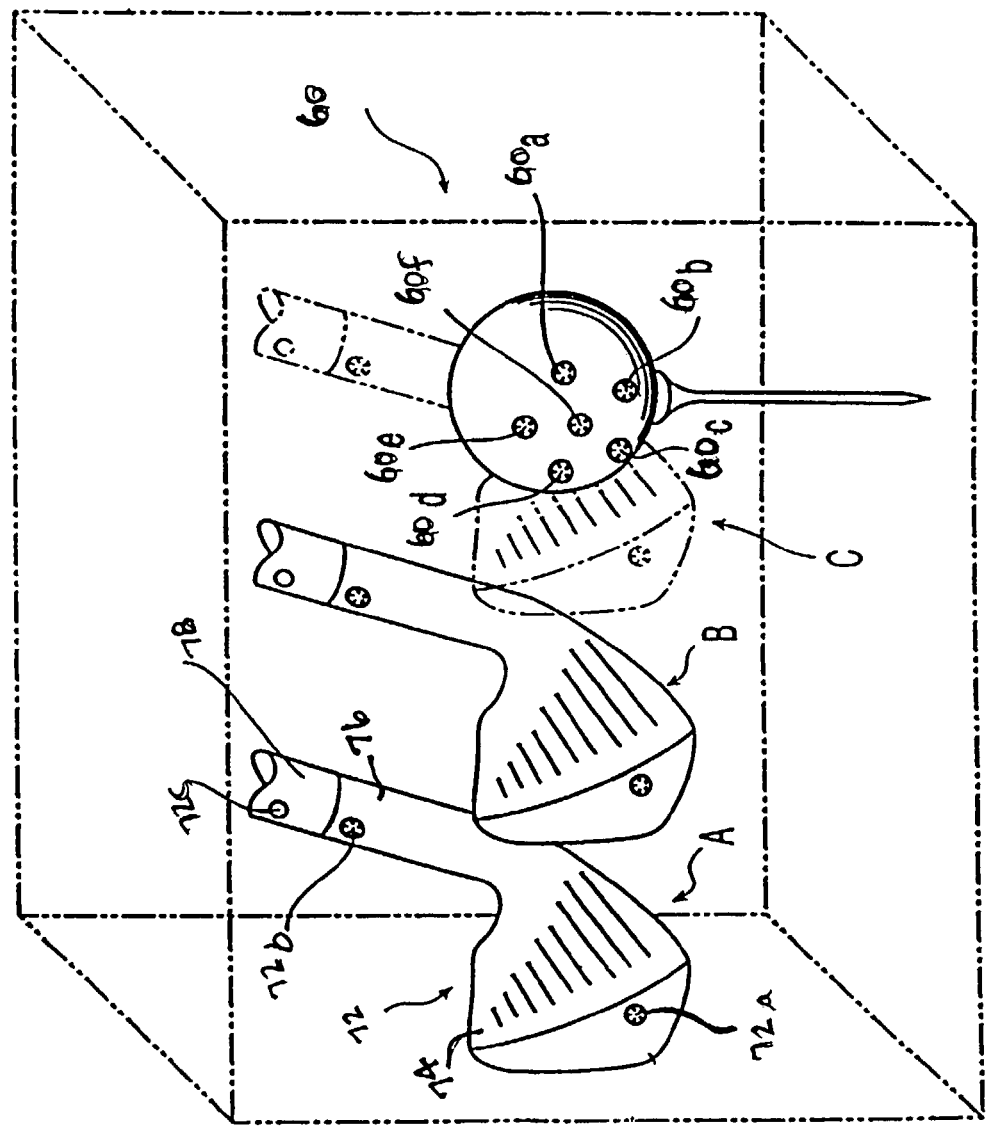
FIG. 14 is a perspective view of a three-dimensional field-of-view of a club head moving partially therethrough and showing a measurable position A, a measurable position B, and a projected impact position C according to one embodiment of the present invention.

After the ball cameras have been "armed", the second sensor causes the club monitor to strobe twice and produce light in the direction of the club on the club downswing. The light reflects off the club markers 72a-c, at positions A and B as shown in FIG. 14. The reflected light passes through the club filters and then is transmitted to the cameras sensory grid panels that are exposed. The club monitor strobes during the same exposure of the sensory grid panels so that the filtered light produces two images of the club head at position A and B in a single frame and the ball on the tee.

Figure 12:
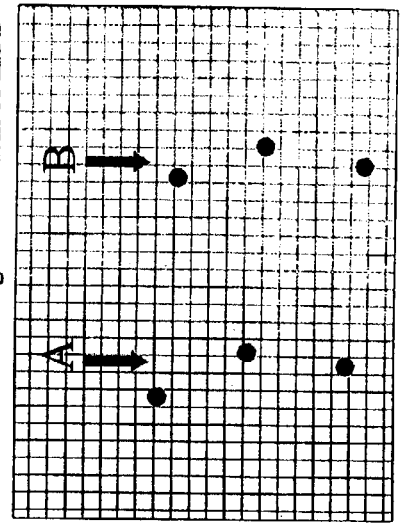
Figure 13:
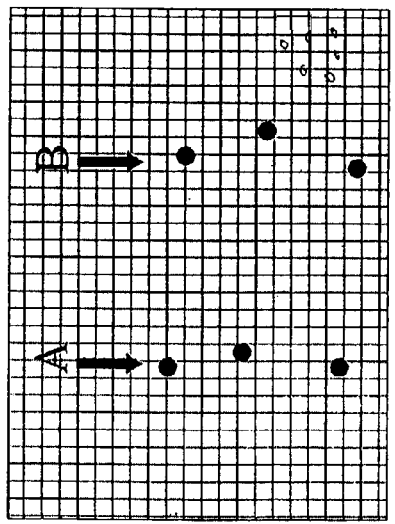

Graphical representations of the pixel maps for the club cameras are shown in FIGS. 12-13. The system should find six bright areas that represent the club markers 72a'-c'.

The ball and club markers are preferably arranged as discussed above and shown in FIGS. 4 and 5. The ball and club markers used should correspond to the ball and club filters (e.g., when green ball filters and red club filters are used, green ball markers and red club markers, respectively, can be used). The ball and club markers, as previously discussed, could differ, e.g, the ball markers can be fluorescent and the club markers can be retro-reflective.

Referring to the system using switchable filters briefly outlined above, and explained here using two cameras 36, 38, Step S104 begins with the operation of a first club motion sensor when the club 72 moves through the player's back swing. The sensor sends a signal to a microprocessor to tell the computer 70 to open the shutter of the cameras 36, 38 that are stereo-viewing the scene. The signal is also sent to the microprocessor to prepare for the signal from a second club motion sensor.

On the downswing, the beam from second club motion sensor is broken and a strobe light flashes twice. With each light flash from the strobe lighting unit 42, electrical energy from a capacitor is drained, in particular, the downswing drains the electrical energy from two of the four capacitors. The light reflected off the club markers 72a-c is filtered by the switchable filters in a corresponding filter mode (e.g., red retro-reflective club markers and a red filter). A trigger 41, i.e., a microphone, senses the sound of the collision of the golf club 72 with the golf ball 60 and provides a signal to the microprocessor to switch the filter from the first filter to the second filter, i.e., converts from red to green, or from "on" to "off".

After the filters are switched, a sequence of two flashes of light are then fired by the strobe light from the electrical energy stored in the remaining two capacitors. The light of the last two strobe flashes reflect off the reflective markers 60a-f on the golf ball 60, are filtered by the second filter, and then transmitted to the cameras 36, 38. The use of the second filter allows the club markers 72a-c, also included in the field-of-view, to be filtered out of the image. As previously discussed with respect to system 10, this arrangement of the system captures two images of both the club 72 and ball 60.

The system can then determine which of the bright areas correspond to the markers at Step S106. This analysis, which can be done in several ways, is discussed in detail in U.S. patent application Ser. No. 09/468,351, now pending.

If the correct number of dots are found in the image, the system moves on to step S107 to determine, from the dots in the images, the position and orientation of the golf ball and/or club during the first and second images. However, if there are more or less than the expected dots or bright areas found in the images, Step S108 allows the operator to manually filter the images. If too few bright areas are located, the operator may adjust the image brightness, and if too many bright areas are present, the operator may delete them. In some instances, the bright areas in the images may be reflections off of other parts of the golf ball or off the golf club head. If it is not possible to adequately adjust the brightness or eliminate those extraneous bright areas, then the system returns the operator to Step S104 to have the golfer hit another golf ball. If the manual editing of the areas is successful, however, then the system goes to Step S107.

At Step S107, the system uses the identification of the markers in step S106 to determine the location of the centers of each of the markers in the images. Knowing the location of the center of each of the markers, the system can calculate the golf club's speed, loft angle, attack angle, path angle, face angle, droop angle, loft spin, face spin, droop spin, and hit location. In addition, the system can calculate the ball's velocity, launch angle, backspin, side angle, side spin rifling spin, carry distance, direction, carry and roll distance. Detailed information regarding the analysis of the images is in U.S. application Ser. No. 09/782,278.

After the spin rate, velocity, and direction are calculated, the system uses this information, as well as the ambient conditions and the golf ball information entered at Step S103 to calculate the trajectory of the golf ball during the shot (Step S109). The system estimates where the golf ball lands or carries, how far it rolls, and gives a total distance for the shot. Because the system is calibrated in three dimensions, the system also is able to calculate if the golf ball has been sliced or hooked, and how far the ball is off line, as discussed in U.S. Pat. No. 6,241,622.

This information (i.e., the golfer's launch conditions) is then presented to the golfer at Step S110, in numerical and/or graphical formats. At Step S111, the launch conditions can be modified to calculate the same information but for the hypothetical use of a different golf ball (e.g., two-piece as compared to a three-piece golf ball). It is also possible to determine the effect a variation in any of the launch conditions (e.g., golf ball speed, spin rate, and launch angle) would have on the results.

Step S112 provides the golfer the option to take more shots by returning the system to Step S104. For example, if the system is in test mode and the golfer takes a variety of shots, Step S113 can calculate the average of all shot data accumulated during the session. Step S114 provides ideal launch conditions for the golfer's specific capabilities, thereby allowing the golfer to make changes and maximize distance. After completing the session, Step S115 allows the golfer to start a new test with a new golf club or to end the session at Step S116.

Thus, the system of the invention can be used to determine the kinematics of two colliding objects, where the measured kinematics data may be compiled into a database and the database can be accessible to a large user group via the internet or internet networks of computers that are linked in a conventional manner. The present invention is also directed to a computer providing on-course kinematic data acquired by the present system. This data may be posted on a computer and transmitted via the internet or intranet computer networks. This data may be provided, for example, for a fee that the computer may process. The data could also be sent from a golf pro shop to a club or ball manufacturer for equipment purchases or recommendations for a specific golfer.

While the above invention has been described with reference to certain preferred embodiments, it should be kept in mind that the scope of the present invention is not limited to just these embodiments. One skilled in the art would recognize numerous variations of the embodiments described herein without departing from the spirit and scope of the invention. For example, the system could be battery operated or include more than two cameras. In addition, the operating system could be an embedded computer or controlled with programmable logic controllers (PLC). Different markers or paints are possible, as well as the use of laser diodes with a narrower light range to avoid the use of filters. The invention may also include remote capability based on radio or infrared frequency. In addition, features of one embodiment can be combined with features of another embodiment. One skilled in the art may find other variations of the preferred embodiments which, nevertheless, fall within the spirit of the present invention, whose scope is defined by the claims set forth below.

What is claimed is:

1. A monitor system for measuring kinematics of at least one object, comprising:
   a light source capable of directing light having a primary excitation wavelength at the at least one object, wherein the at least one object has fluorescent markers with a primary emission wavelength arranged thereon;
   a camera;
   a light receiver comprising a filter having a primary transmission wavelength, wherein the light receiver is selectively positioned to receive light emitted by the fluorescent markers; and
   a computing device operably connected to the light source and the camera;
   wherein the fluorescent markers are arranged on the at least one object according to a pattern such that the pattern is symmetric only after being rotated through an angle $\alpha$, wherein $\alpha$ is greater than 72°.

2. The monitor system of claim 1, wherein the markers are arranged on the object such that the angle $\alpha$ is at least approximately 90°.

3. The monitor system of claim 1, wherein the markers are arranged on the object such that the angle $\alpha$ is at least approximately 120°.

4. The monitor system of claim 1, wherein the markers are arranged on the object such that the angle $\alpha$ is at least approximately 180°.

5. The monitor system of claim 1, wherein the markers are arranged on the object such that the angle $\alpha$ is approximately 360°.

6. The monitor system of claim 1, further comprising a wireless communication device operably connected to the computing device.

7. A monitor system for measuring kinematics of at least one object, comprising:
   a lighting unit capable of directing light having a primary excitation wavelength at the at least one object, wherein the at least one object has fluorescent markers with a primary emission wavelength arranged thereon;
   a camera unit,
   a wireless communication device having a data transfer rate;
   a light receiver comprising a filter having a primary transmission wavelength, wherein the light receiver is selectively positioned to receive light emitted by the fluorescent markers;
   a trigger; and
   a computing device operably connected to the lighting unit, the camera unit, the wireless communication device, the light receiver, and the trigger.

8. The monitor system of claim 7, wherein the lighting unit includes a light filter.

9. The monitor system of claim 7, wherein the lighting unit includes a light source that produces a narrow spectrum of light.

10. The monitor system of claim 7, wherein the data transfer rate of the wireless communication device is about 10 Mb/s or greater.

11. The monitor system of claim 7, wherein the data transfer rate of the wireless communication device is about than 100 Mb/s or greater.

12. The monitor system of claim 7, wherein the wireless communication device conforms to IEEE 802.11.

13. The monitor system of claim 7, wherein the camera unit includes a camera filter.

14. The monitor system of claim 13, wherein the camera filter is a band pass filter.

15. The monitor system of claim 13, wherein the camera filter is a switchable filter.

16. The monitor system of claim 7, wherein the trigger is an acoustically activated trigger.

17. The monitor system of claim 7, wherein the trigger is a position activated trigger.

18. The monitor system of claim 17, wherein the trigger is an optically activated trigger.

19. The monitor system of claim 7, wherein the fluorescent markers are arranged on the at least one object according to a pattern such that the pattern is symmetric only after being rotated through an angle $\alpha$, wherein $\alpha$ is greater than 72°.

20. A method of calculating the trajectory of an object based on flight characteristics measured while the object is moving in a predetermined field-of-view, comprising:
providing a pattern of fluorescent markers arranged on the object according to a pattern such that the pattern is symmetric only after being rotated through an angle $\alpha$, $\alpha$ being greater than 72°;
providing a portable launch monitor system having a first camera unit pointed toward the predetermined field-of-view, the launch monitor system being coupled to a support structure for allowing easy transport thereof, the portable launch monitor system further having a lighting unit capable of directing light having a primary excitation wavelength at the object, wherein the fluorescent markers have a primary emission wavelength and a light receiver comprising a filter having a primary transmission wavelength, wherein the light receiver is selectively positioned to receive light emitted by the fluorescent markers;
taking at least two images of the object while in the predetermined field-of-view, the at least two images taken at two different times;
determining the locations and orientations of the object in the predetermined field-of-view from the images;
calculating launch conditions of the object from the locations and orientations of the object; and
calculating the trajectory of the object from the calculated launch conditions.

21. The monitor system of claim 20, wherein the markers are arranged on the object such that the angle $\alpha$ is at least approximately 90°.

22. The monitor system of claim 20, wherein the markers are arranged on the object such that the angle $\alpha$ is at least approximately 120°.

23. The monitor system of claim 20, wherein the markers are arranged on the object such that the angle $\alpha$ is at least approximately 180°.

24. The monitor system of claim 20, wherein the markers are arranged on the object such that the angle $\alpha$ is approximately 360°.

* * * * *